(12) United States Patent
Stamoulis et al.

(10) Patent No.: US 8,737,314 B2
(45) Date of Patent: May 27, 2014

(54) TRAFFIC MANAGEMENT FOR MULTI-HOP WIRELESS COMMUNICATION

(75) Inventors: Anastasios Stamoulis, San Diego, CA (US); Ashwin Sampath, Princeton, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 976 days.

(21) Appl. No.: 12/031,621

(22) Filed: Feb. 14, 2008

(65) Prior Publication Data

US 2009/0207777 A1 Aug. 20, 2009

(51) Int. Cl.
- *H04W 4/00* (2009.01)
- *H04W 72/04* (2009.01)
- *H04W 72/08* (2009.01)
- *H04L 12/56* (2006.01)

(52) U.S. Cl.
CPC .......... *H04W 72/0406* (2013.01); *H04W 72/04* (2013.01); *H04W 72/082* (2013.01); *H04L 47/30* (2013.01)
USPC .......................................... 370/329; 455/450

(58) Field of Classification Search
None
See application file for complete search history.

(56) References Cited

U.S. PATENT DOCUMENTS

| | | | |
|---|---|---|---|
| 6,064,892 A * | 5/2000 | Miyagawa et al. | 455/560 |
| 6,473,617 B1 * | 10/2002 | Larsen et al. | 455/446 |
| 6,502,131 B1 | 12/2002 | Vaid et al. | |
| 6,587,441 B1 | 7/2003 | Urban et al. | |
| 6,708,324 B1 | 3/2004 | Solloway et al. | |
| 6,871,233 B1 | 3/2005 | Bearden et al. | |
| 6,920,171 B2 | 7/2005 | Souissi et al. | |
| 6,996,061 B2 | 2/2006 | Yang et al. | |
| 7,197,019 B2 | 3/2007 | Menzel et al. | |
| 7,590,064 B1 * | 9/2009 | Zhang et al. | 370/235 |
| 7,599,340 B2 | 10/2009 | Chandra et al. | |
| 7,634,287 B1 * | 12/2009 | Bambos et al. | 455/522 |
| 7,729,240 B1 | 6/2010 | Crane et al. | |
| 7,746,822 B2 * | 6/2010 | Xue et al. | 370/328 |
| 2003/0074443 A1 | 4/2003 | Melaku et al. | |
| 2003/0135700 A1 | 7/2003 | Schultz et al. | |
| 2004/0023660 A1 | 2/2004 | Ben-Eli | |
| 2004/0047324 A1 | 3/2004 | Diener | |

(Continued)

FOREIGN PATENT DOCUMENTS

| | | |
|---|---|---|
| CN | 1754335 A | 3/2006 |
| CN | 1926820 A | 3/2007 |

(Continued)

OTHER PUBLICATIONS

International Search Report and Written Opinion—PCT/US2009/034129, International Search Authority—European Patent Office—Dec. 6, 2009.

(Continued)

*Primary Examiner* — Bunjob Jaroenchonwanit
(74) *Attorney, Agent, or Firm* — Dang M. Vo

(57) ABSTRACT

Various traffic management techniques may be employed in a multi-hop wireless communication system. For example, a decision to transmit data to another node may be based on whether that node is able to effectively transmit its data. A decision to transmit an interference management message may be based on the amount of data a parent node may transmit. A decision to transmit an interference management message may be based on how effectively data is being transmitted. A weight may be assigned for an interference management message based on a traffic scheduling policy.

38 Claims, 17 Drawing Sheets

(56) References Cited

U.S. PATENT DOCUMENTS

| | | | |
|---|---|---|---|
| 2004/0109435 A1 | 6/2004 | Alasti et al. | |
| 2004/0248580 A1 | 12/2004 | Backes et al. | |
| 2004/0259589 A1 | 12/2004 | Bahl et al. | |
| 2005/0025114 A1* | 2/2005 | Ware et al. | 370/346 |
| 2005/0036466 A1 | 2/2005 | Malik et al. | |
| 2005/0044206 A1 | 2/2005 | Johansson et al. | |
| 2005/0123027 A1 | 6/2005 | Cioffi et al. | |
| 2005/0186916 A1 | 8/2005 | Moon et al. | |
| 2005/0192037 A1 | 9/2005 | Nanda et al. | |
| 2006/0056382 A1* | 3/2006 | Yamada et al. | 370/349 |
| 2006/0106946 A1 | 5/2006 | Agarwal et al. | |
| 2006/0106964 A1 | 5/2006 | Clark et al. | |
| 2006/0133342 A1 | 6/2006 | Zeng | |
| 2006/0159004 A1* | 7/2006 | Ji | 370/208 |
| 2006/0160555 A1* | 7/2006 | Kobayashi et al. | 455/522 |
| 2007/0019583 A1 | 1/2007 | Laroia et al. | |
| 2007/0091863 A1* | 4/2007 | Sampath et al. | 370/338 |
| 2007/0105573 A1 | 5/2007 | Gupta et al. | |
| 2007/0105574 A1 | 5/2007 | Gupta et al. | |
| 2007/0105575 A1 | 5/2007 | Sampath et al. | |
| 2007/0105576 A1 | 5/2007 | Gupta et al. | |
| 2007/0115817 A1* | 5/2007 | Gupta et al. | 370/230 |
| 2008/0004055 A1 | 1/2008 | Yannay et al. | |
| 2008/0008147 A1 | 1/2008 | Nakayama | |
| 2008/0062911 A1* | 3/2008 | Choi et al. | 370/315 |
| 2008/0107035 A1* | 5/2008 | Zhu et al. | 370/241 |
| 2008/0108355 A1* | 5/2008 | Oleszcsuk | 455/442 |
| 2008/0165727 A1 | 7/2008 | Xiaoben et al. | |
| 2008/0200195 A1 | 8/2008 | Abe et al. | |
| 2008/0212539 A1 | 9/2008 | Bottomley et al. | |
| 2008/0240054 A1* | 10/2008 | Sandhu et al. | 370/338 |
| 2008/0298450 A1 | 12/2008 | Zhang et al. | |
| 2008/0316935 A1* | 12/2008 | Bala et al. | 370/252 |
| 2009/0061939 A1 | 3/2009 | Andersson et al. | |
| 2009/0069023 A1 | 3/2009 | Ahn et al. | |
| 2009/0141668 A1 | 6/2009 | Zhang et al. | |
| 2009/0175225 A1 | 7/2009 | Bi et al. | |
| 2009/0196177 A1 | 8/2009 | Teyeb et al. | |
| 2009/0207730 A1 | 8/2009 | Stamoulis et al. | |
| 2009/0209262 A1 | 8/2009 | Stamoulis et al. | |
| 2010/0178921 A1 | 7/2010 | Aqvist et al. | |
| 2010/0246417 A1 | 9/2010 | Cheng et al. | |
| 2011/0026429 A1* | 2/2011 | Ben Slimane et al. | 370/252 |

FOREIGN PATENT DOCUMENTS

| | | |
|---|---|---|
| EP | 1509011 | 2/2005 |
| EP | 1718005 | 11/2006 |
| JP | 2002335581 A | 11/2002 |
| JP | 2004147256 A | 5/2004 |
| JP | 2004343641 A | 12/2004 |
| JP | 2005244963 A | 9/2005 |
| JP | 2006101477 A | 4/2006 |
| JP | 2006180139 A | 7/2006 |
| JP | 2006279234 A | 10/2006 |
| JP | 2008017325 A | 1/2008 |
| JP | 2011512758 A | 4/2011 |
| WO | 9722196 | 6/1997 |
| WO | 2005088917 A1 | 9/2005 |
| WO | 2005099189 A1 | 10/2005 |
| WO | WO2007056630 A2 | 5/2007 |

OTHER PUBLICATIONS

European Search Report—EP08006446; European Search Authority—The Hague—Jul. 21, 2008.

Taiwan Search Report—TW098104730—TIPO—Mar. 12, 2012.

Sakamoto H., et al., "Wireless Multihop Transmission of Sensor Data with Buffering in Neighbor Sensor Nodes for Shorter Transmission Delay," Technical Report of the Information Processing Society of Japan, Groupware and Network Service, 2007 (91), Japan, The Information Processing Society of Japan, Sep. 20, 2007, pp. 67-72.

Zhu H., "rDCA: A Relay-Enabled Medium Access Control Protocol for Wireless Ad Hoc Networks," IEEE Transaction on Mobile Computing, 2006, pp. 1-32.

* cited by examiner

TRAFFIC MANAGEMENT FOR MULTI-HOP WIRELESS COMMUNICATION

CROSS-REFERENCE TO RELATED APPLICATIONS

This application is related to concurrently filed and commonly owned U.S. patent application entitled "TRAFFIC MANAGEMENT EMPLOYING INTERFERENCE MANAGEMENT MESSAGES," Ser. No. 12/031,631; and U.S. patent application entitled "SCHEDULING POLICY-BASED TRAFFIC MANAGEMENT," and Ser. No. 12/031,641; the disclosure of each of which is hereby incorporated by reference herein.

BACKGROUND

1. Field

This application relates generally to wireless communication and more specifically, but not exclusively, to managing multi-hop traffic.

2. Introduction

Various network topologies may be employed to establish wireless communication. For example, a wide area network, a local area network, or some other type of network may be deployed depending on the desired wireless communication capabilities.

A wireless wide area network may be implemented as a planned deployment within a licensed frequency band. Such a network may be designed to optimize spectral efficiency and quality of service to support a relatively large number of users. A cellular network is one example of a wireless wide area network.

A wireless local area network is often deployed without centralized planning. Such a network may be deployed, for example, in unlicensed spectrum utilizing an infrastructure-based architecture or ad hoc-based architecture. This type of network may typically support a relatively smaller number of users. A Wi-Fi network is one example of a wireless local area network.

In practice, the above networks may have various disadvantages due to tradeoffs that may be made to provide a given type of service. For example, due to the complexity of centralized planning, setting up a wireless wide area network may be relatively expensive. Moreover, this type of network may not effectively handle dynamic traffic flows. Hence, such a scheme may not be well suited for "hot spot" deployments. On the other hand, an unplanned wireless local area network may not achieve the same level of spatial efficiency (bits/unit area) as a planned network. Moreover, to compensate for potential interference between nodes in the network, an unplanned scheme may employ interference mitigation techniques such as carrier sense multiple access. In practice, however, interference mitigation techniques such as these may lead to poor utilization, limited fairness control, and susceptibility to hidden and exposed nodes.

U.S. Patent Application Publication No. 2007/0105574, the disclosure of which is hereby incorporated by reference, describes various techniques that may be advantageously employed in a wireless communication system. In some aspects such a system may employ timeslot-based communication where multiple wireless nodes in the system may simultaneously transmit and receive over a given channel during designated timeslots.

Here, fair-sharing of a wireless channel may be facilitated by joint scheduling of a transmission by a transmitter of one node and a receiver of another node. For example, a node that wishes to transmit may request a set of resources (e.g., one or more timeslots on one or more channels) based on knowledge of the availability of wireless resources in its neighborhood. In response to this request, a node that will receive the transmission may grant some or all of the requested channels based on the node's knowledge of the availability of wireless resources in its neighborhood. For example, a node that intends to transmit may learn of resource availability by listening to neighboring nodes that may receive when the node wishes to transmit. Conversely, a node that intends to receive may learn of potential interference by listening to neighboring nodes that may transmit when the node wishes to receive. In the event a node determines that its reception will or may be affected by neighboring transmissions, the node may transmit a resource utilization message ("RUM") in an attempt to cause the neighboring nodes to limit their interfering transmissions. According to related aspects, RUMs may be weighted to indicate not only that a node is disadvantaged (e.g., due to the interference it sees while receiving) and desires a collision avoidance mode of transmission, but also the degree to which the node is disadvantaged.

A node that receives a RUM may utilize the fact that it has received a RUM, as well as the weight thereof, to determine an appropriate response. For example, a node may elect to abstain from transmitting or it may reduce its transmit power during one or more designated timeslots. Alternatively, the node may ignore the RUM if, for example, it has received a RUM that indicates that an associated node is more disadvantaged than any other nodes that transmitted RUMs. In this case, the node may elect to transmit to its associated node during the designated timeslot(s). The advertisement of weights may thus provide a collision avoidance scheme that is fair to all nodes in the system.

SUMMARY

A summary of sample aspects of the disclosure follows. It should be understood that any reference to the term aspects herein may refer to one or more aspects of the disclosure.

The disclosure relates in some aspects to managing traffic in a multi-hop wireless communication system. Here, managing traffic may relate to, for example, determining whether to transmit data, and determining whether and how to transmit interference management (e.g., mitigation) messages.

The disclosure relates in some aspects to determining whether to transmit data to another node based on whether that node is able to effectively transmit its data. For example, the node may not be able to transmit data effectively due to a bottleneck in its transmit path. In this case, a decision may be made to not transmit to this node, since any data transmitted to the node may not be forwarded by that node in an efficient manner.

The disclosure relates in some aspects to determining whether to transmit an interference management message (e.g., a RUM) based on the amount of data that may be received from a parent node. As mentioned above, under certain circumstances, an interference management message may be used to reserve resources (e.g., bandwidth) for the reception of data. However, in the event a parent node does not have much data to send, a decision may be made to not transmit an interference management message even when the quality of service associated with received data is inadequate. By foregoing the use of an interference management message under these circumstances, the node advantageously avoid reserving resources that may end up not being efficiently utilized.

The disclosure relates in some aspects to determining whether to transmit an interference management message from a given node based on how effectively that node transmits its data. For example, in the event the node is unable to effectively transmit data (e.g., due to a bottleneck in a transmit path), the node may elect to not transmit an interference management message. That is, the node may avoid transmitting an interference management message that it may otherwise transmit upon detection of inadequate quality of service for its received data. This may be desirable, for example, since any data that is received through the use of the interference management message may not end up being forwarded to the intended destination in an efficient manner.

The disclosure relates in some aspects to assigning an indication relating to quality of service (e.g., a weight) for an interference management message based on a traffic scheduling policy of another node. Here, the scheduling policy for a hierarchy of nodes may specific how data flow is to be distributed across the nodes of the hierarchy. For example, a scheduling policy may specify an equal grade of service across relay nodes in the hierarchy or across all leaf nodes of the hierarchy. In some aspects, a weight of an interference management message transmitted by a node of the hierarchy may thus be based on the amount of traffic that is expected through that node according to the scheduling policy.

BRIEF DESCRIPTION OF THE DRAWINGS

These and other sample aspects of the disclosure will be described in the detailed description and the appended claims that follow, and in the accompanying drawings, wherein:

Figure 1:
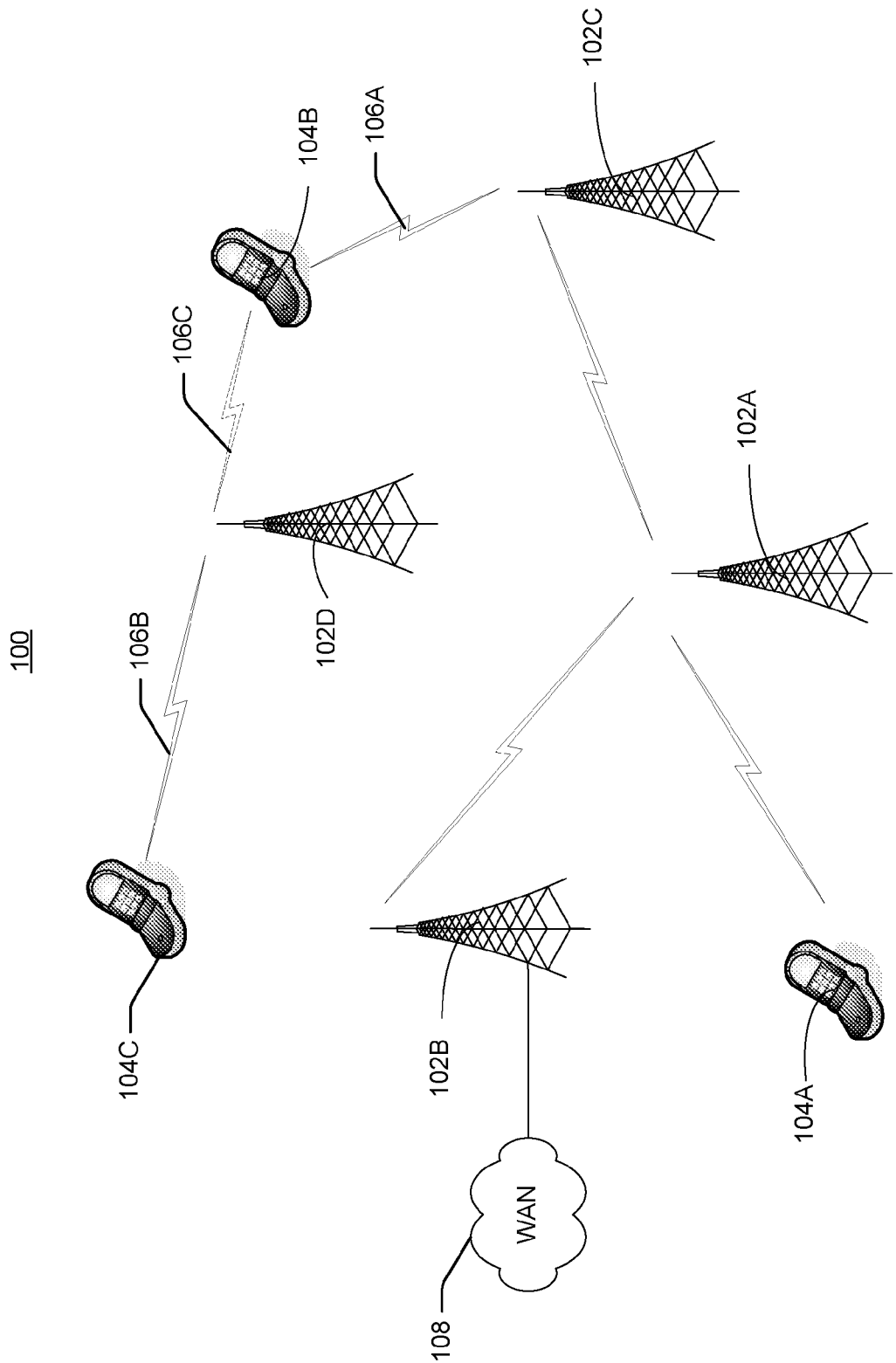
FIG. 1 is a simplified diagram of sample aspects of a wireless communication system.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim. As an example of the above, in some aspects a method of wireless communication comprises receiving, at a first wireless node, information relating to data buffered at a second wireless node for transmission to a third wireless node, and determining, based on the information, whether to transmit to the second wireless node. In addition, in some aspects the information indicates a status of a transmit buffer of the second wireless node.

FIG. 1 illustrates several sample aspects of a wireless communication system 100. The system 100 includes several wireless nodes, generally designated as nodes 102 and 104. Each node may comprise at least one antenna and associated receiver and transmitter components to establish communication with other nodes in the system. In the discussion that follows the term receiving node may be used to refer to a node that is receiving and the term transmitting node may be used to refer to a node that is transmitting. Such a reference does not imply that the node is incapable of performing both transmit and receive operations.

A node may be implemented in various ways. For example, a node may comprise an access terminal, an access point, or some other network-related component. In the example of FIG. 1, the nodes 102 may comprise access points and the nodes 104 may comprise access terminals. The nodes 102 may thus facilitate communication between the nodes of a network (e.g., a Wi-Fi network, a cellular network, or a WiMax network) and provide access to another network. For example, when an access terminal (e.g., an access terminal 104A) is within a coverage area of an access point (e.g., a wireless access point 102A), the access terminal 104A may thereby associate with and establish a communication link with another device of the system 100 or of some other network. Here, one or more of the nodes (e.g., a node 102B) may comprise a wired access point that provides connectivity to another network or networks (e.g., a wide area network 108 such as the Internet). In addition, one or more of the nodes 102 may comprise a relay node (e.g., a wireless access point) that provides connectivity between other nodes (e.g., a wired access point, another relay node, or an access terminal).

As a specific example, the nodes 104A and 102B may associate with one another via the node 102A (e.g., a relay node). Consequently, each of the nodes 104A and 102B establishes a corresponding communication link to the relay node 102A. As a result, one or more traffic flows may be established over each of these links to and from the access terminal 104A and to and from the access point 102B.

Figure 2:
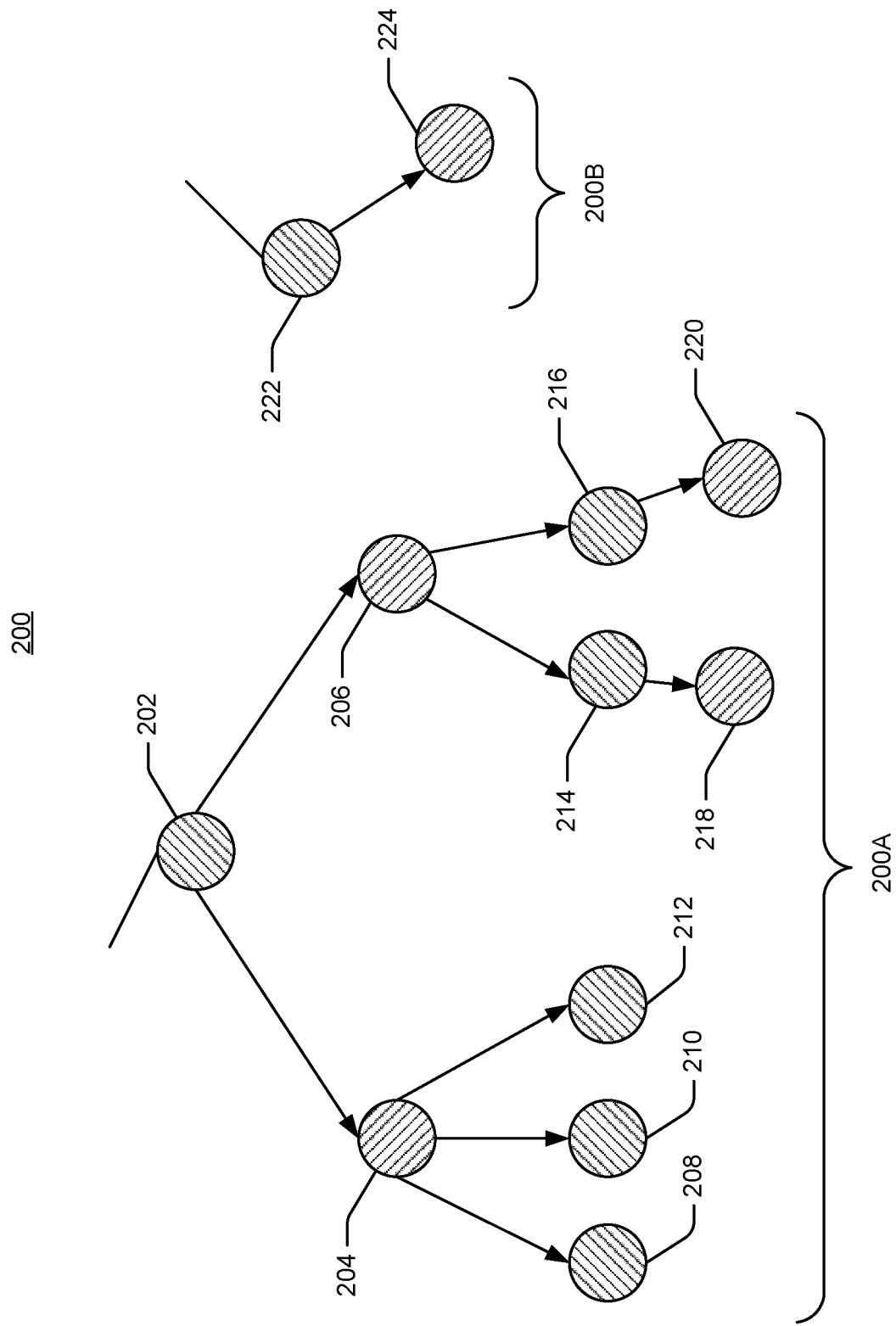
FIG. 2 is a simplified diagram of sample aspects of a hierarchy of wireless nodes.

FIG. 2 illustrates a simplified example of traffic flow for two groups of nodes 200A and 200B (e.g., two neighboring cells) in a communication system 200. For illustration purposes, this example only shows one of the directions of traffic flow (as represented by the arrowed lines) of a sample hierarchical routing scheme. In the first group 200A, traffic flowing to a first node 202 (e.g., a wired access point) is distributed to neighboring nodes 204 and 206. The nodes 204 and 206 then distribute the traffic to nodes in their respective vicinities (nodes 208-212 and nodes 214-216, respectively). This distribution scheme may be continued throughout the group to enable all of the nodes in the group to receive traffic from at least one other node. In the second group 200B, a pair of nodes 222 and 224 are in relatively close proximity to the nodes 206 and 216 of the first group 200A.

As represented by the shading in FIG. 2, each node in the system 200 may be configured to transmit or to receive during certain timeslots. In a relatively simple example, a first set of nodes (e.g., nodes 202, 208, 210, 212, 214, 216, and 222) may initially be configured to transmit during odd numbered timeslots and while a second set of nodes (e.g., nodes 204, 206, 218, 220, and 224) may initially be configured to transmit during even numbered timeslots. Conversely, the first set of nodes may thus receive data during even numbered timeslots and the second set of nodes may receive data during odd numbered timeslots.

The example of FIG. 2 depicts an alternating timeslot scheme whereby different timeslots are assigned to each successive level in the hierarchical tree. Such an alternating timeslot scheme may enable more efficient multiplexing of data flows in multi-hop configurations. For example, the nodes in the system may be assigned certain timeslots depending upon the nodes' relative proximity to other nodes in the system (e.g., corresponding to the node positions in the hierarchical tree). Here, when the nodes that transmit during the same timeslot are spaced a sufficient distance apart, the nodes may be able to successfully transmit to their receiving nodes without causing undue interference at other receiving nodes. As a specific example, the node 202 may send data to the node 204 during an odd timeslot, whereby the node 204 forwards that data to the node 208 during the next even timeslot. In this case, the transmission by the node 202 may not unduly interfere with reception at nodes 208-216 since these nodes are not receiving when the node 202 is transmitting.

In some cases (e.g., in the above examples), two or more nodes in a system may attempt to transmit at the same time (e.g., during the same timeslot). Depending on the relative locations of the transmitting and receiving nodes and the transmit power of the transmitting nodes, wireless transmissions from one node may interfere with reception at another node (e.g., a non-associated node) in the system. For example, the node 104B of FIG. 1 (e.g., node 216 of FIG. 2) may receive data from the node 102C (e.g., node 206) during certain timeslots as represented by a wireless communication symbol 106A in FIG. 1. At the same time, a node 102D (e.g., node 222) may be transmitting to a node 104C (e.g., node 224) as represented by communication symbol 106B. Depending on the distance between the nodes 104B and 102D and the transmission power of the node 102D, transmissions from the node 102D as represented by a dashed symbol 106C may interfere with reception at the node 104B.

To mitigate interference such as this, the nodes of a wireless communication system may employ an interference management messaging scheme. For example, a receiving node that is experiencing interference may transmit a RUM (e.g., via a control packet) to indicate that the node is disadvantaged in some way. In some aspects a decision by a receiving node to transmit a RUM may be based, at least in part, on quality of service associated with data received at that node. For example, a receiving node may repeatedly monitor the current level of quality of service for one or more of its links or flows (e.g., using a sliding window or some other suitable technique). The node may then transmit a RUM in the event the current level of quality of service falls below a desired quality of service level. Conversely, the node may not transmit a RUM if the quality of service is acceptable. Here, an unacceptable quality of service level may relate to low throughput, high latency (e.g., high packet delay), or some other quality of service-related parameter.

As mentioned above, a neighboring node that receives a RUM (e.g., a potential interferer) may elect to limit its future transmissions in some way to avoid interfering with the RUM-sending node (i.e., the receiving node that sent the RUM). For example, a given RUM may be associated with a given timeslot whereby a potential interferer may elect to limit its transmission during that timeslot in response to the RUM. Thus, via this interference management scheme, traffic flows of nodes that are experiencing good quality of service may be constrained in an attempt to improve the quality of service at nodes that have not been experiencing good quality of service.

Referring now to FIGS. 3-15, several techniques are described that may be used to improve performance in a wireless communication system. For example, the use of one or more of these techniques may improve quality of service in the system, may reduce interference between nodes, or may result in more efficient utilization of system resources. As discussed herein, in some aspects such a system may employ multiple hops and/or an interference management scheme.

Figure 3:
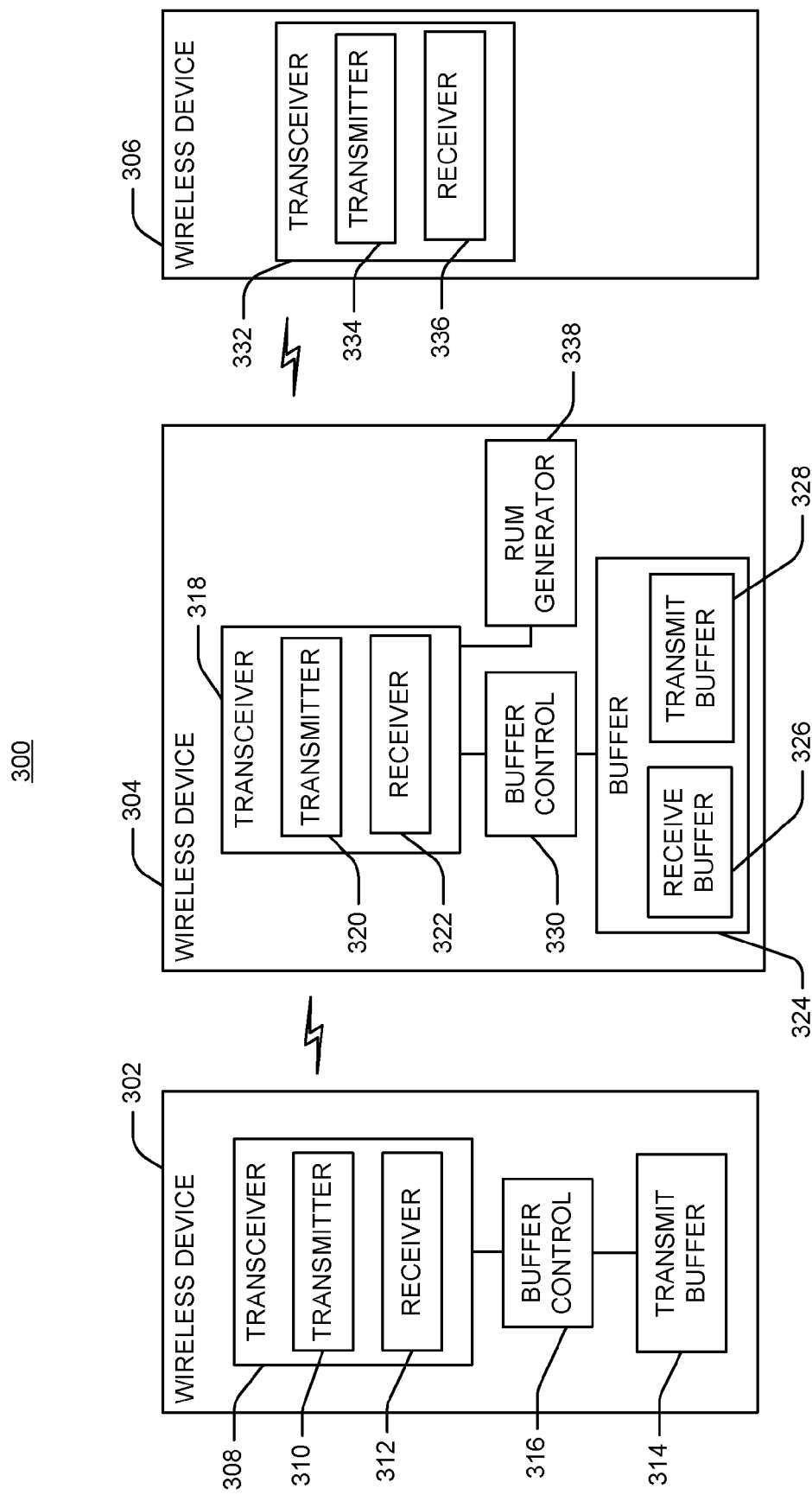
FIG. 3 is a simplified block diagram of several aspects of sample components of a wireless communication system in a multi-hop configuration.

To facilitate the discussion that follows, a brief description is provided in FIG. 3 of several components that may be employed in wireless devices in conjunction with routing data in a multi-hop environment. Here, a system 300 includes wireless devices 302, 304, and 306 that may correspond to, for example, a set of associated wireless nodes as described herein. In some aspects the device 302 may comprise an upstream node or a node at a higher level of a node hierarchy. In some aspects the device 304 may comprise a relay node or a node at a middle level of a node hierarchy. In some aspects the device 306 may comprise a downstream node or a node at a lower level of a node hierarchy. It should be appreciated, however, that the components described for a given device may be implemented in other devices associated with other positions in a multi-hop hierarchy.

The device 302 includes a transceiver 308 for establishing wireless communication with the device 304 and any other neighboring devices (not shown in FIG. 3). The transceiver 308 comprises a transmitter component 310 and a receiver component 312. For outgoing traffic, the device 302 may include a transmit buffer 314 for buffering data to be transmitted to the device 304 and other devices. As will be discussed in more detail below, the device 302 may buffer data to be transmitted when a corresponding receiving device is not ready to receive the data. To this end, the device 302 may include a buffer control component 316 that determines, for example, when data is to be buffered in the transmit buffer 314 and when data is to be read out of the transmit buffer 314 and sent to the transmitter 310 for transmission.

The device 304 includes similar communication components to facilitate the reception and transmission of data. For example, a transceiver 318 includes a transmitter 320 and a receiver 322 for communicating with the devices 302 and 306 and other nodes in the system (not shown). In addition, the device 304 includes a buffer component 324 that may comprise a receive buffer 326 for buffering received data (e.g., from the device 302) and a transmit buffer 328 for buffering data to be transmitted (e.g., to the device 306). Moreover, the device 304 may include a buffer control component 330 for managing when or how data is to be buffered in the buffer 324 and when or how data is to be read out of the buffer 324 (e.g., and sent to the transmitter 320 for transmission).

The device 304 also may include a component for generating interference management messages. For illustration purposes, such a component will be described in the context of a RUM generator 338 that generates RUMs.

The device 306 also includes similar communication components to facilitate the reception and transmission of data. For example, a transceiver 332 includes a transmitter 334 and a receiver 336 for communicating with the device 304 and other nodes in the system (not shown). In addition, the device 304 may include buffer-related components (not shown) that facilitate the reception of incoming data and the transmission of outbound data.

In practice, the buffers described above may comprise one or more buffers. For example, a given device may define multiple buffers, each of which is associated with a particular link or flow. For convenience, the description herein may simply refer to "a buffer" in certain contexts. It should be appreciated that such a reference may be equally applicable to one or more buffers.

Figure 4:
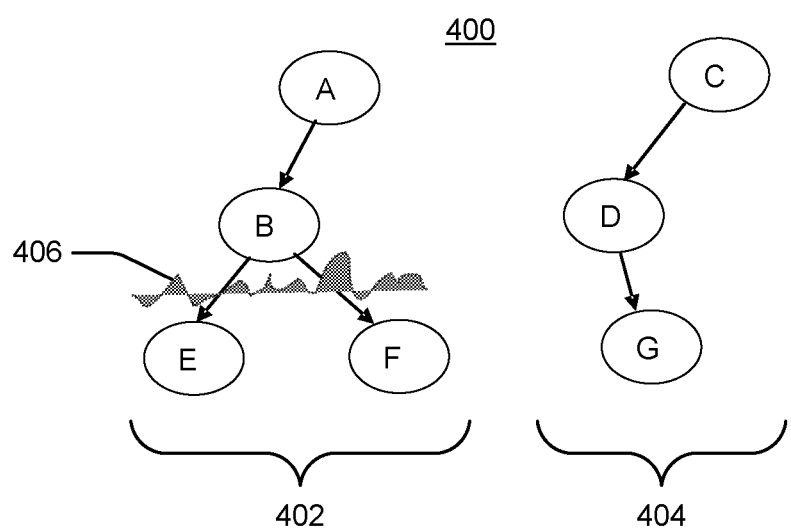
FIG. 4 is a simplified diagram illustrating sample aspects of traffic flow between wireless nodes.
Figure 5:
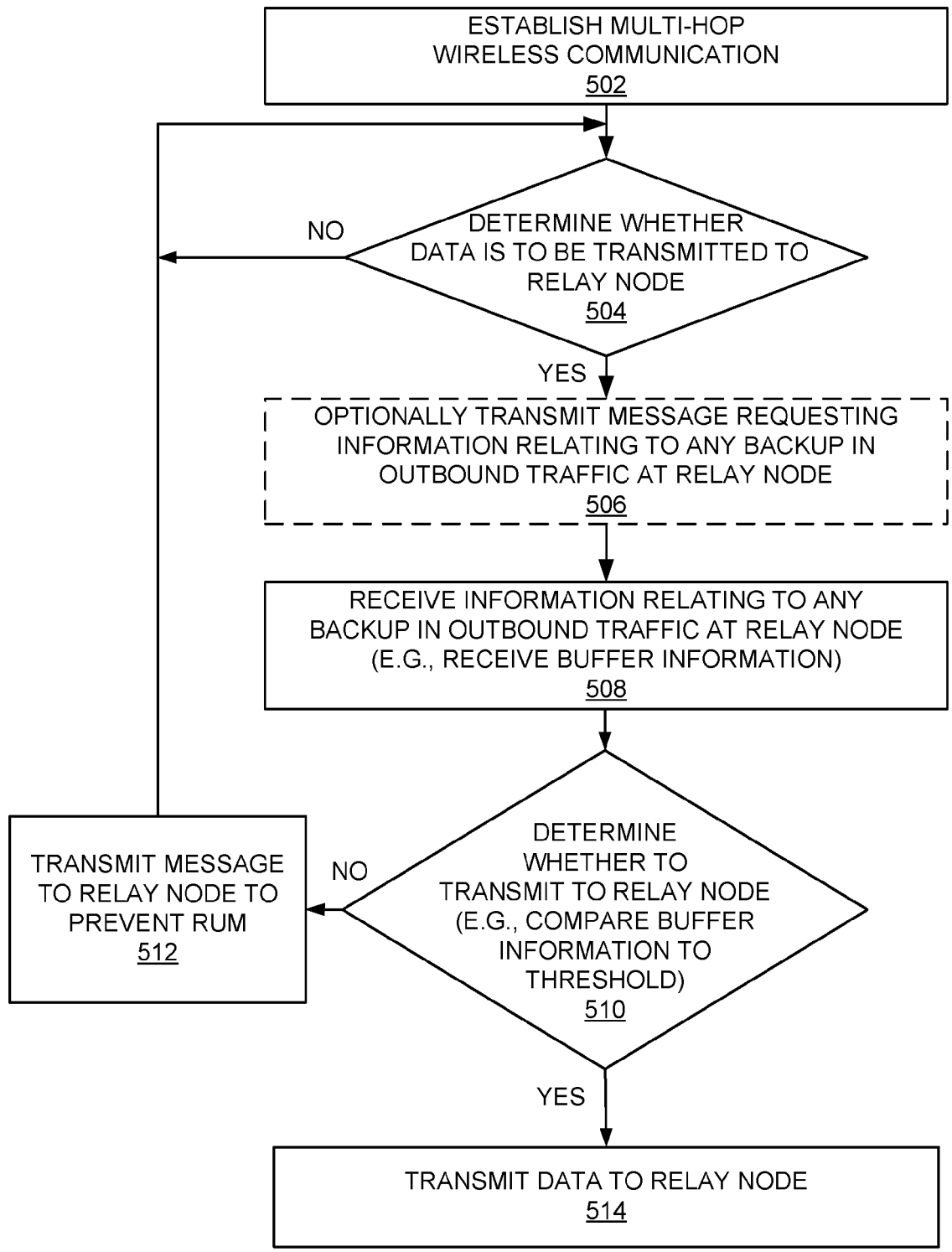
FIG. 5 is a flowchart of several sample aspects of operations that may be performed to facilitate traffic flow in a wireless communication system.
Figure 6:
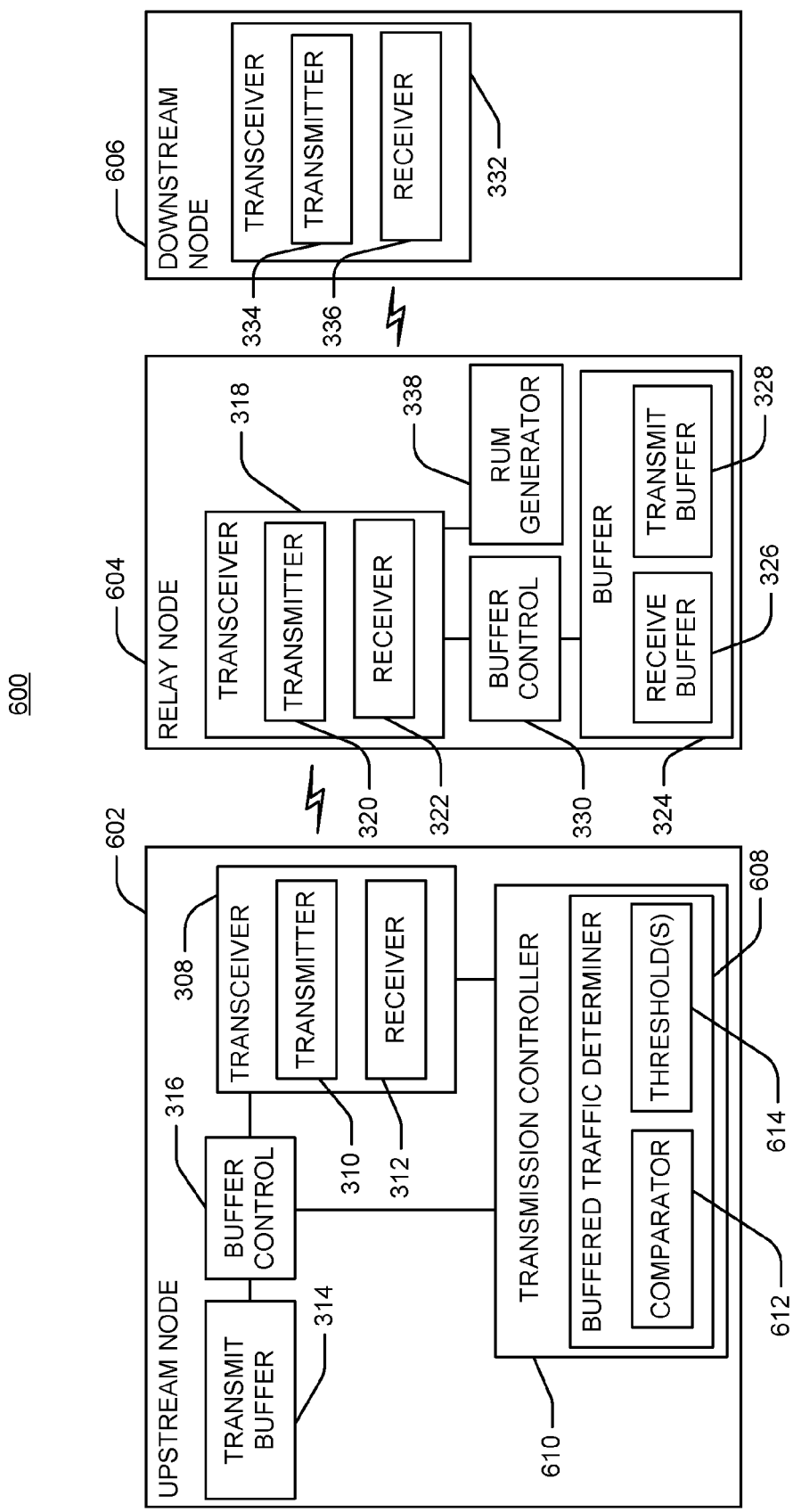
FIG. 6 is a simplified block diagram of several aspects of sample components of a wireless communication system.

Referring now to FIGS. 4-6, in some aspects a decision to transmit information from one node to another node is based on the effectiveness with which the node that is to receive the information is transmitting its information. For example, in a multi-hop scenario, a decision may be made to not transmit data to a given node if that node will not forward the data in a desired manner (e.g., at a desired throughput rate or within a desired latency time).

FIG. 4 illustrates an example of a system 400 including a first set of nodes 402 and a second set of nodes 404. In the multi-hop scenario of the set 402, a node A transmits data to a node B, and node B transmits data to nodes E and F. In the multi-hop scenario of the set 404, a node C transmits data to a node D, and node D transmits data to a node G. Again, for convenience, only one direction of data flow between nodes is illustrated in FIG. 4.

As represented by a symbol 406, the link between nodes B and E and the link between nodes B and F may be bottlenecks in the system. For example, nodes E and F may be experiencing interference when they are receiving data from node B. In this case, if node A transmits data to node B, this data may accumulate in a buffer at node B due to the bottleneck between node B and nodes E and F. This data may thus simply remain at node B until the backlog at node B is reduced. Consequently, a transmission from node A to node B may not provide much benefit to overall system performance at that time. However, such a transmission may interfere with reception at node D (e.g., transmissions from node C).

In view of the above, a decision regarding whether a transmitting node should send data to a receiving node may advantageously be based on information that the transmitting node obtains regarding the transmission of data by the receiving node. For example, if the transmitting node determines that a receiving relay node has buffered an amount of data that equals or exceeds a given threshold, the transmitting node may determine that there is a bottleneck affecting transmissions by the relay node. In this case, the transmitting node may not send more data to the relay node since sending this data may result in the underutilization of bandwidth in the system.

FIG. 5 illustrates several operations that may be performed in conjunction with determining whether to transmit to a relay node. For convenience, the operations of FIG. 5 (or any other operations discussed or taught herein) may be described as being performed by specific components (e.g., components of a system 600 described in FIG. 6). It should be appreciated, however, that these operations may be performed by other types of components and may be performed using a different number of components. It also should be appreciated that one or more of the operations described herein may not be employed in a given implementation.

As represented by block 502 of FIG. 5, a set of nodes in a system may establish communication whereby the traffic traverses multiple hops. For example, in the system 600 (FIG. 6) a downstream node 606 (e.g., device 306 of FIG. 3) may be associated with an upstream node 602 (e.g., device 302) whereby the node 602 sends data to the node 606 via a relay node 604 (e.g., device 304).

As represented by block 504, at various points in time the node 602 may determine whether there is any data that needs to be sent to the node 604. As an example, an application running on the node 602 may generate data that needs to be sent to the node 606 via the node 604.

As represented by blocks 506 and 508, the node 602 may acquire information indicative of whether there is a backup in traffic (e.g., as evidenced by buffered transmit data) at the node 604. This information may take various forms. For example, in some aspects this information may relate to a status of a transmit buffer at the node 604. In some aspects this information may relate to a rate at which the node 604 transmits the data for a given data flow. In some aspects this information may relate to a reduction in data throughput over a data routing path. Here, an increase in the amount of buffered data or a decrease in data flow rate or data throughput may indicate some form of bottleneck in an outbound link (e.g., a link to node 606) of the node 604.

Block 506 relates to a scenario where the upstream node 602 may request the traffic backup information (e.g., buffer status) from the relay node 604. For example, a buffered traffic determiner 608 of the node 602 may repeatedly (e.g., periodically) send a message to the node 604 requesting that the node 604 send the buffer status information to the node 602.

In other cases, the node 604 may unilaterally send this information to the node 602. For example, in some aspects the buffer control component 330 may be adapted to repeatedly (e.g., periodically) send buffer status information or transmit data rate or throughput information to the node 602.

In any event, as represented by block 508, at some point in time the receiver 312 of the node 602 may receive information relating to data buffered for transmission at the node 604. As represented by block 510, a transmission controller 610 of the node 602 may determine whether to transmit to the node 604 based on the acquired information. For example, in some aspects the buffered traffic determiner 608 may comprise a comparator 612 for comparing the acquired information (e.g., amount of buffered data, a data flow rate, a throughput rate, etc.) with one or more thresholds 608 to identify a potential backup in traffic.

It should be appreciated that operations such as these may be performed in various ways and by various components. For example, in some cases the node 604 (e.g., buffer control 330) may perform these types of comparison operations. In these cases, the node 604 may send a traffic backup information message whenever the amount of buffered data is equal to or greater than a threshold level, or whenever a transmit data rate or throughput is less than or equal to a threshold level.

In the event it is determined that there is a bottleneck associated with the node 604, the transmission controller 610 may delay its transmissions to the node 604. In this case, the node 602 may temporarily buffer the data in its transmit buffer 314. The node 602 may then continue to monitor the status of the node 604 to determine when this buffered data should be sent to the node 604.

As represented by block 512, in the event the node 602 abstains from transmitting, the transmission controller 610 may transmit a message to the node 604 to inform the node 604 that it should not expect a transmission (e.g., for a given period of time). In this way, the RUM generator 338 of the node 604 may be prevented from transmitting RUMs that it may otherwise send as a result of the reduced traffic from the node 602. In other words, the node 602 may send a message to the node 604 instructing the node 604 to not transmit RUMs based on a reduction in the quality of service associated with data received by the node 604 from the node 602.

As represented by block 514, once the transmission controller 610 determines that data may be sent to the node 604, the buffer control component 316 may cooperate with the transmitter 310 to transmit at least a portion of the data from the buffer 314. The node 604 may then forward that data to the intended destination (e.g., node 606) as discussed above in conjunction with FIG. 3.

The traffic management scheme of FIGS. 4-6 may useful even when a data source uses a protocol such TCP which throttles down the offered load in cases of network congestion. In such a case, TCP may react to network congestion at a larger time-scale than a time-scale at which the above described scheme may apply. Here, TCP may eventually reduce the offered load, but this may happen only after a substantial amount of bandwidth over a link has been underutilized. In contrast, the above scheme may be implemented to respond more quickly to congestion, thereby enabling more efficient utilization of network resources.

Figure 7:
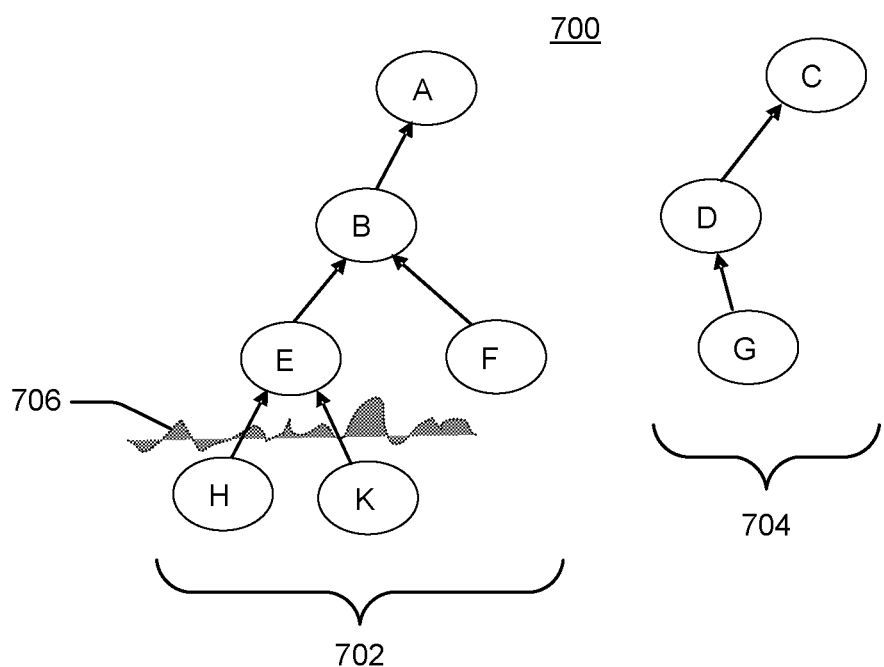
FIG. 7 is a simplified diagram illustrating sample aspects of traffic flow between wireless nodes.
Figure 8:
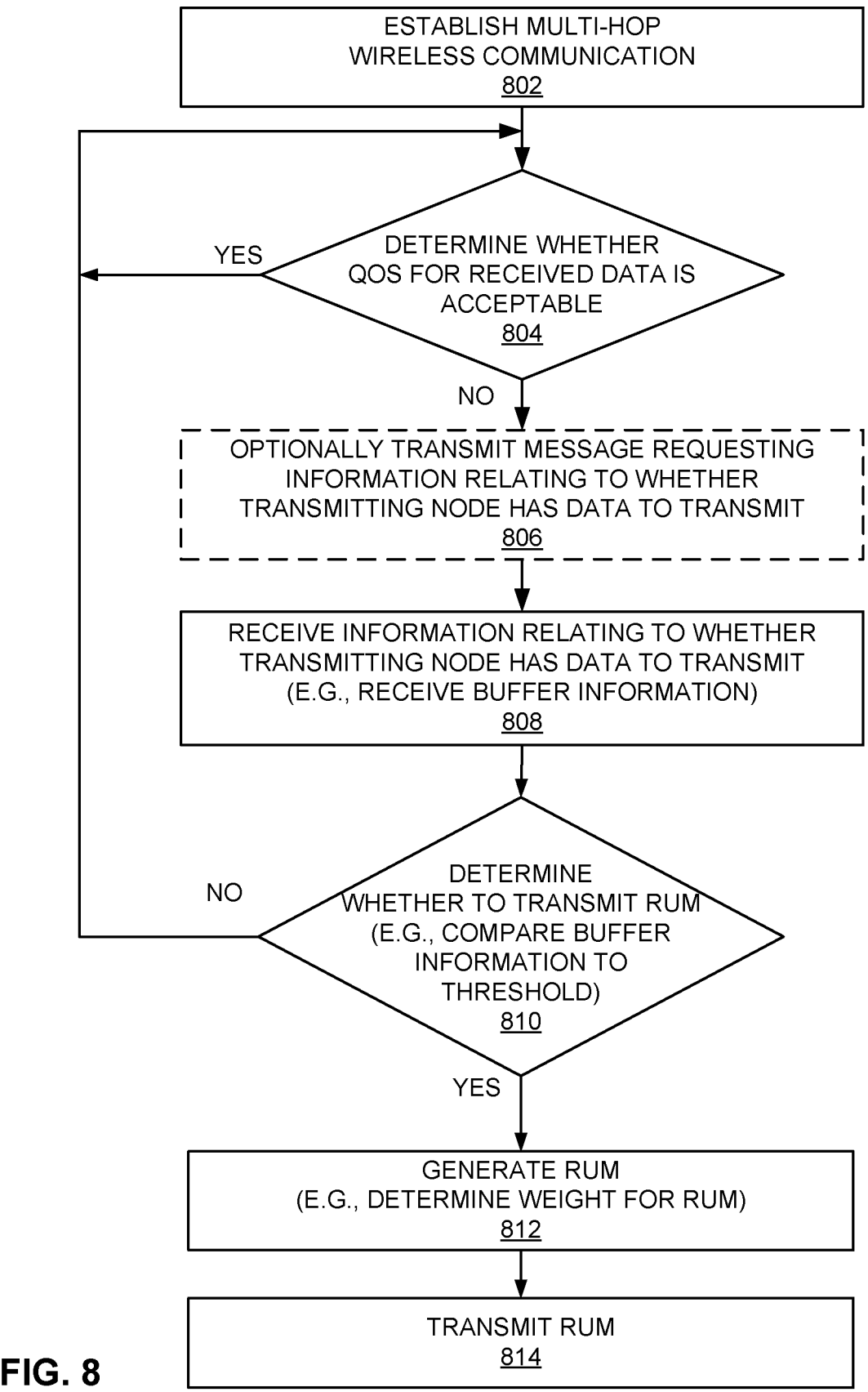
FIG. 8 is a flowchart of several sample aspects of operations that may be performed to facilitate traffic flow in a wireless communication system.
Figure 9:
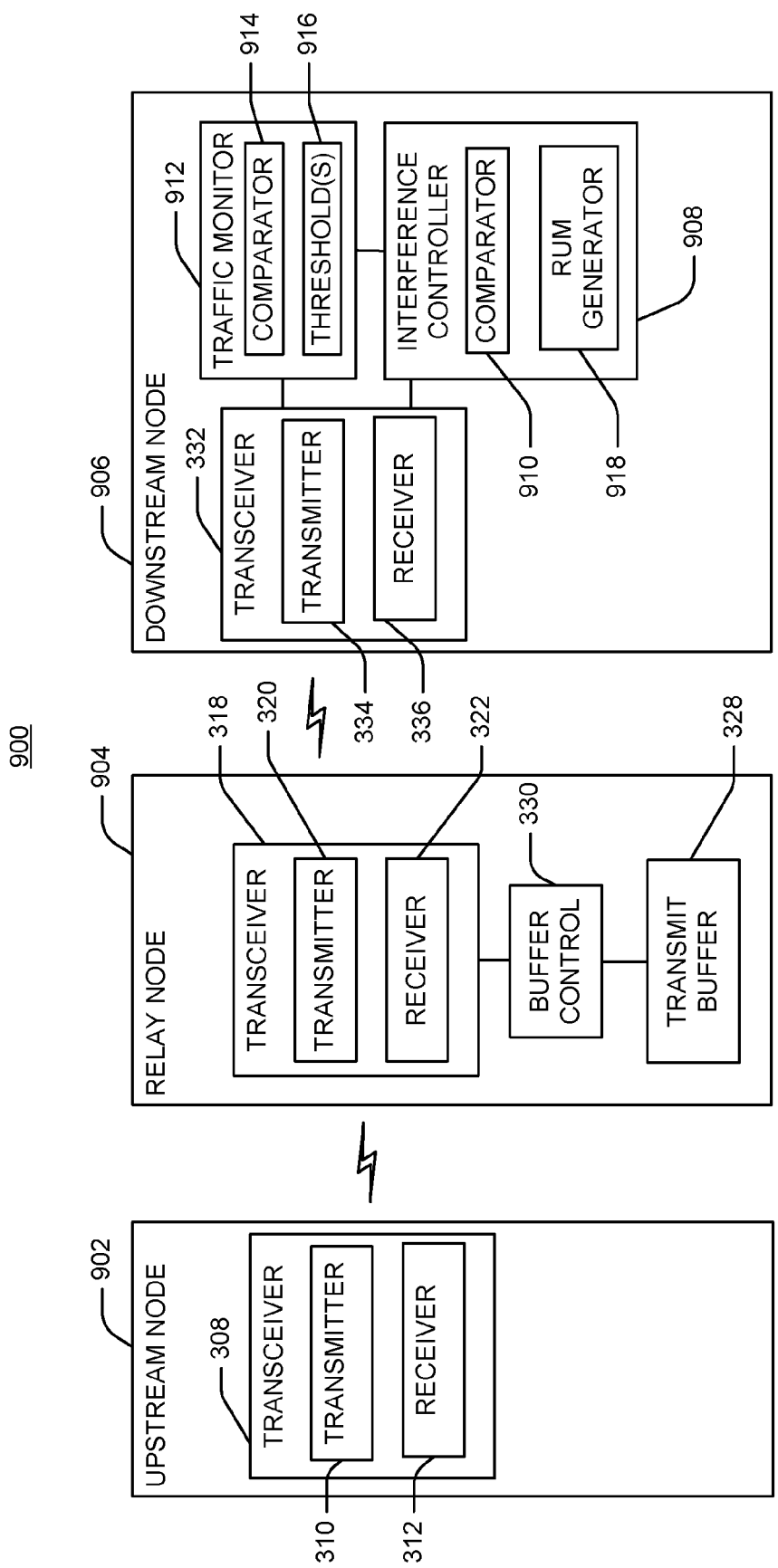
FIG. 9 is a simplified block diagram of several aspects of sample components of a wireless communication system.

Referring now to FIGS. 7-9, in some aspects a decision by a given node to transmit an interference management message (e.g., a RUM) is based on the amount of data that will be sent to the node. For example, a receiving node may not transmit an interference management message, even when quality of service associated with received data is unacceptable, in cases where the corresponding transmitting node does not have appreciable data to send to the receiving node.

FIG. 7 illustrates an example of a system 700 including a first set of nodes 702 and a second set of nodes 704. In the multi-hop scenario of the set 702, nodes H and K transmit data to a node E, nodes E and F transmit data to a node B, and node B transmits data to a node A. In the multi-hop scenario of the set 704, a node G transmits data to a node D, and node D transmits data to a node C. For convenience, only one direction of data flow between nodes is illustrated in FIG. 7.

As represented by a symbol 706, the link between nodes H and E and the link between nodes K and E may be bottlenecks in the system. For example, node E may be experiencing interference when it is receiving data from nodes H and K. In this case, node E may not have the usual amount of data to transmit to node B. As a result, node B may detect a reduction in quality of service (e.g., lower throughput or increased data delay) associated with data received from node E. In this case, however, the reduction in quality of service is not due to interference experienced by node B, but is instead a result of another bottleneck in the system. Consequently, a transmission of an interference management message by node B may not improve the quality of service at node B. However, the transmission of an interference management message by node B may cause node G to limit its transmissions to node D. As a result, system bandwidth may end up being underutilized since node E may not be able to utilize bandwidth (e.g., timeslots) reserved by node B's interference management message.

In view of the above, a decision regarding whether a receiving node should transmit an interference management message may advantageously be based on information that the receiving node acquires regarding transmission of data by an associated transmitting node. For example, if the receiving node determines that a transmitting relay node has buffered an amount of data that is less than or equal to a threshold amount, the receiving node may determine that there is a bottleneck affecting reception at the relay node. In this case, the receiving node may not transmit an interference management message since this may result in the underutilization of bandwidth in the system.

FIG. 8 illustrates several operations that may be performed in conjunction with determining whether to transmit an interference management message. As represented by block 802, a set of nodes in a system may establish communication whereby the traffic traverses multiple hops. For example, in a system 900 as shown in FIG. 9, a downstream node 906 (e.g., device 306 of FIG. 3) may be associated with an upstream node 902 (e.g., device 302) whereby the node 902 sends data to the node 906 via a relay node 904 (e.g., device 304).

As represented by block 804 of FIG. 8, an interference controller 908 of the node 906 may determine whether quality of service ("QOS") associated with received data is acceptable. In some aspects this operation may involve using a comparator 910 to compare a quality of service-related threshold with a quality of service metric associated with recently received data. For example, a defined quality of service threshold (e.g., a RUM sending threshold) may relate to an expected level of quality of service associated with one or more links or data flows. In addition, the interference controller 908 may repeatedly acquire quality of service information associated with received data to provide quality of service metric information. For example, the interference controller 908 may use a sliding window to measure throughput or latency of recently received data. In the event the quality of service is unacceptable, the node 906 may then attempt to determine whether the degradation in quality of service is a result of transmissions by neighboring nodes that interfere with reception at the node 906 or is a result of some other condition in the network (e.g., that causes a disruption in traffic flow to node 904).

As represented by blocks 806 and 808, at various points in time a traffic monitor 912 of the node 906 may acquire information indicative of whether the node 904 has data to send to the node 906. This information may take various forms. In some aspects this information may relate to status of the transmit buffer 328 at the node 904. For example, this status may indicate how much data is stored in the transmit buffer 328. In some cases this status may comprise a buffer-full indication such as the value of a buffer-full bit of the transmit buffer 328. In some aspects the acquired information may comprise a TCP congestion indication. For example, the traffic monitor 912 may be adapted to analyze TCP messages to determine whether a TCP congestion bit is set for one or more traffic flows that flow through the node 904 (e.g., from the node 902).

Block 806 relates to a scenario where the downstream node 906 may request the traffic information (e.g., buffer status) from the relay node 904. For example, the traffic monitor 912 may repeatedly (e.g., periodically) send a message to the node 904 requesting that the node 904 (e.g., buffer control 330) send the buffer status information to the node 906.

In other cases, the node 904 may unilaterally send this information to the node 906. For example, the buffer control component 330 may be adapted to repeatedly (e.g., periodically) send buffer status information to the node 906.

In either of the above cases, as represented by block 808, at some point in time the traffic monitor 912 may receive information via the receiver 336 relating to whether the node 904 has data to transmit. As represented by block 810, the interference controller 908 may then determine, based on the acquired information, whether to transmit an interference management message (e.g., a RUM).

In some aspects the traffic monitor 912 may comprise a comparator 914 for comparing the acquired information with one or more thresholds 916 to determine whether the node 904 has data to send. For example, as mentioned above the acquired information may relate to the amount of data in the transmit buffer 328. A threshold 916 may thus be defined to reflect the amount of buffered data below which interference management messages will not be sent. It should be appreciated that operations such as these may be performed in various ways and by various components. For example, in some cases the node 904 (e.g., buffer control 330) may perform these types of comparison operations. In these cases, the node 904 may send a traffic information message whenever the amount of buffered data is less than or equal to a threshold level.

In the event it is determined at block 810 that an interference management message should not be sent (e.g., the transmit buffer 328 is not full or is low on data), the operational flow may proceed as indicated in FIG. 8. Thus, the node 906 may continue monitoring the quality of service of received data and continue monitoring whether there is data to be transmitted by the node 904 as discussed above.

If, on the other hand, it is determined that interference at the node 906 may have caused the reduction in quality of service (e.g., as indicated by the transmit buffer 328 being full), a RUM generator 918 of the node 906 may generate a RUM (block 812). As mentioned above, in some cases an interference management message such as a RUM may include an indication relating to quality of service. In some aspects, such an indication relates to an entitlement of a node to a particular resource (e.g., one or more timeslots of one or more wireless channels). For convenience, the discussion that follows will refer to an example of a RUM weight. In some cases, a RUM weight may be defined as a quantized value of a ratio of the desired quality of service (e.g., corresponding to a RUM sending threshold) and a quality of service metric relating to the quality of service that is actually achieved. At block 814, the transmitter 334 may then transmit the generated RUM in an attempt to cause any interfering nodes to limit their respective transmissions.

Figure 10:
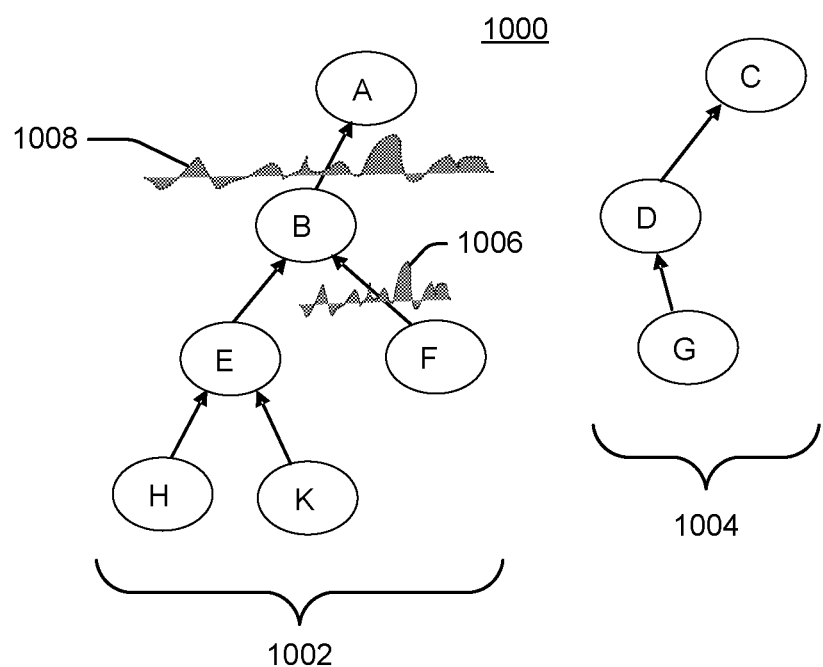
FIG. 10 is a simplified diagram illustrating sample aspects of traffic flow between wireless nodes.
Figure 11:
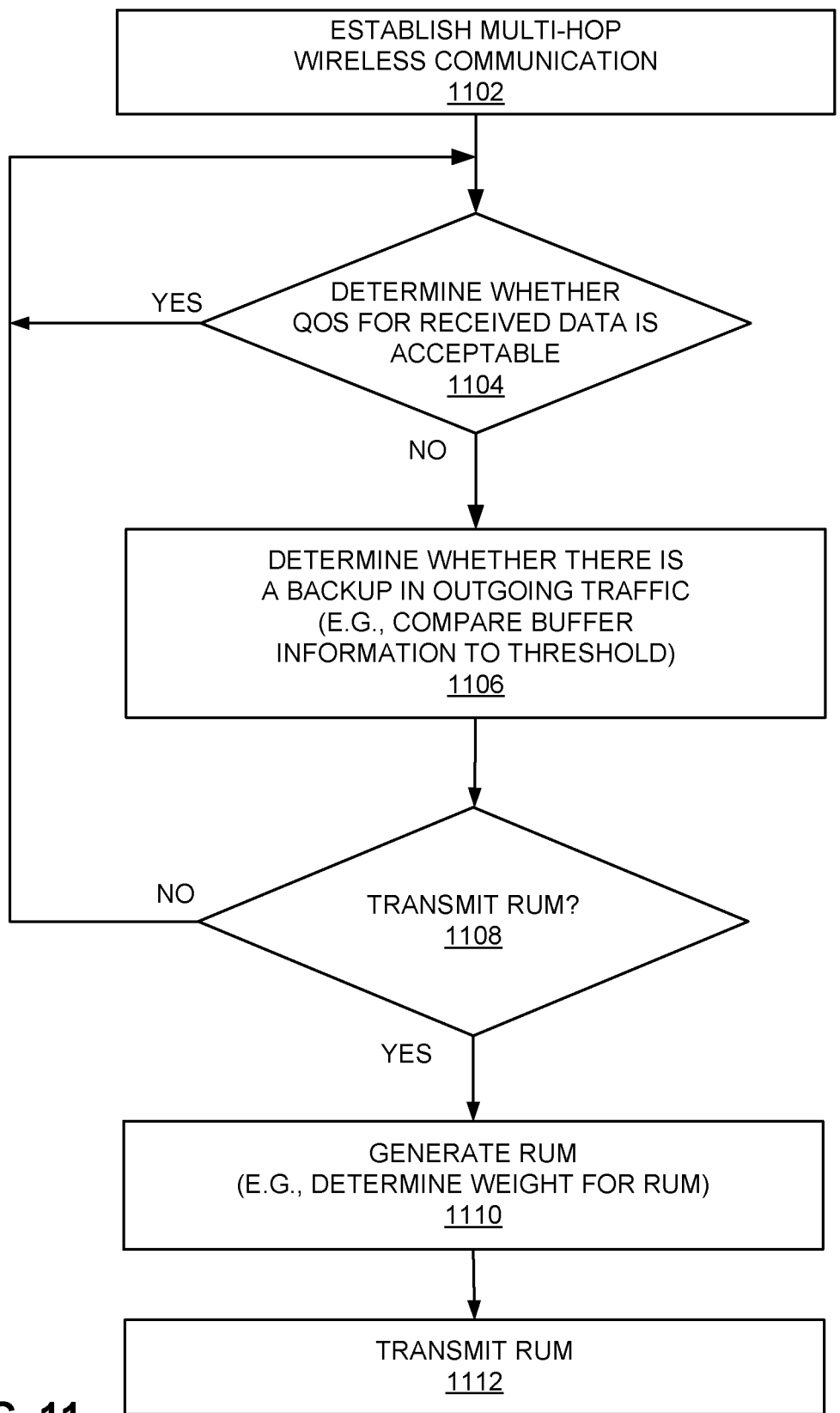
FIG. 11 is a flowchart of several sample aspects of operations that may be performed to facilitate traffic flow in a wireless communication system.
Figure 12:
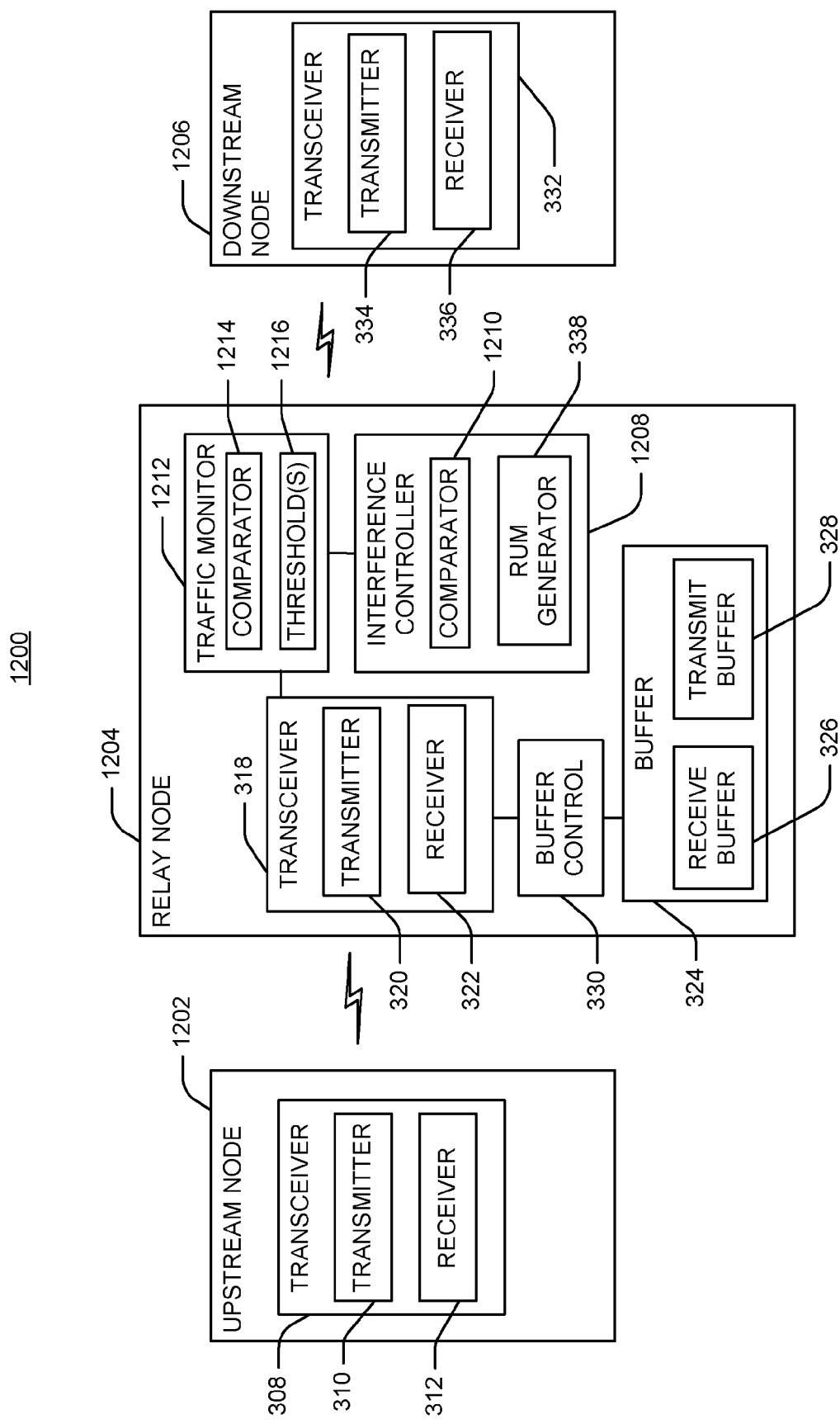
FIG. 12 is a simplified block diagram of several aspects of sample components of a wireless communication system.

Referring now to FIGS. 10-12, in some aspects a decision by a given node to transmit an interference management message (e.g., a RUM) is based on the ability of that node to transit data. For example, when there is a bottleneck in a system that prevents a node from transmitting data in a desired manner, the node may elect to not transmit an interference management message when quality of service associated with its received data is unacceptable.

FIG. 10 illustrates an example of a system 1000 including a first set of nodes 1002 and a second set of nodes 1004. In the multi-hop scenario of the set 1002, nodes H and K transmit data to a node E, nodes E and F transmit data to a node B, and node B transmits data to a node A. In the multi-hop scenario of the set 1004, a node G transmits data to a node D, and node D transmits data to a node C. For convenience, only one direction of data flow between nodes is illustrated in FIG. 10.

As represented by a symbol 1006, the link between nodes F and B may be a bottleneck in the system. For example, node B may be experiencing interference when it is receiving data from node F. As a result, node B may receive less data than it expects (e.g., data that is to be transmitted to node A). Under normal circumstances, Node B may therefore elect to transmit an interference management message (e.g., a RUM) due to the reduction in quality of service (e.g., reduced throughput or increased data delay) associated with data received from node F.

However, as represented by a symbol 1008, there may be another bottleneck in the system at the link between nodes B and A. For example, node A also may be experiencing interference when it is receiving data from node B. As a result, any data received by node B may simply backup at node B waiting for an opportunity to be transmitted to node A (e.g., node B is not draining its transmit buffer fast enough).

Consequently, a transmission of an interference management message by node B in response to the inadequate quality of service associated with reception from node F may not improve the overall quality of service for that flow through the system 1000. However, the transmission of an interference management message by node B may cause node G to limit its transmissions to node D. As a result, system resources may end up being utilized inefficiently since any resource reserved by node B's interference management message may be used to send data that simply queues up at node B. In other words, it may be inefficient from an overall system perspective to restrict a flow of traffic that is not subject to any bottlenecks in its path through the system when the purpose of that restriction is to improve a traffic flow that is subject to a bottleneck at a later point in its path.

In view of the above, a decision regarding whether a receiving node should transmit an interference management message may advantageously be based on how effectively that node transmits data. For example, if the receiving node determines that it has buffered an amount of transmit data that is greater than or equal to a threshold amount, the receiving node may determine that there is a bottleneck affecting its transmissions. In this case, the receiving node may not transmit an interference management message in response to inadequate quality of service associated with received data, since this may result in the underutilization of system resources.

FIG. 11 illustrates several operations that may be performed in conjunction with determining whether to transmit an interference management message. As represented by block 1102, a set of nodes in a system may establish communication whereby the traffic traverses multiple hops. For example, in a system 1200 as shown in FIG. 12, a relay node 1204 (e.g., device 304 of FIG. 3) may receive data from an upstream node 1202 (e.g., device 302) and transmit data to a downstream node 1206 (e.g., device 306).

As represented by block 1104 of FIG. 11, an interference controller 1208 of the node 1204 may determine whether quality of service associated with received data is acceptable.

In a similar manner as discussed above, this operation may involve a comparator 1210 comparing a quality of service-related threshold (e.g., a RUM sending threshold) with a quality of service metric associated with received data.

In the event the quality of service is unacceptable, the node 1204 may attempt to determine whether there is a backup in its outgoing traffic. For example, as represented by block 1106, a traffic monitor 1212 of the node 1204 may acquire information indicative of how well the node 1204 has been able to transmit its data (e.g., to the node 1206). This information may take various forms. In some aspects this information may relate to status of the transmit buffer 328 of the node 1204. For example, this status may indicate how much data is stored in the transmit buffer 328. In some cases this status may comprise a buffer-full indication such as the value of a buffer-full bit of the transmit buffer 328. In some aspects the acquired information may relate to the rate at which the node 1204 transmits its data. For example, the traffic monitor 1212 may repeatedly (e.g., continually via a sliding window) monitor the rate at which data is output by the transmit buffer 328.

In a similar manner as mentioned above, the traffic monitor 1212 may comprise a comparator 1214 for comparing the buffer information or other information with one or more thresholds 1216 to determine whether there is a backup in outgoing traffic. Thus, the comparator 1214 may be adapted to compare the amount of data in the transmit buffer 1228 or an outbound data rate with a corresponding threshold value 1216. Here, the threshold 1216 may correspond to the amount of buffered data above which interference management messages will not be sent or the data rate below which interference management messages will not be sent.

As represented by block 1108, the interference controller 1208 may then determine, based on the buffer status or other suitable information, whether to transmit an interference management message (e.g., a RUM). In the event it is determined that an interference management message should not be sent (e.g., the transmit buffer 328 is relatively full or the outbound data rate is relatively low), the node 1204 may continue monitoring the quality of service of received data and continue monitoring whether there is a backup in traffic as indicated by the flow of FIG. 11.

If it is determined at block 1108 that there is not a backup in outgoing traffic at the node 1204 (e.g., as indicated by the transmit buffer 328 being relatively empty or the outbound data rate being relatively high) the RUM generator 338 of the node 1204 may generate a RUM at block 1110. As mentioned above, in some cases this may involve determining a weight value for the RUM. As represented by block 1112, the transmitter 334 may then transmit the generated RUM in an attempt to improve node B's reception of data from node F.

Figure 13:
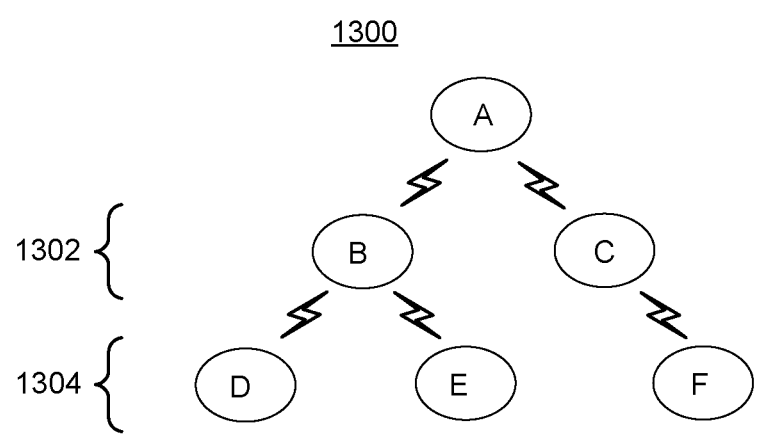
FIG. 13 is a simplified diagram illustrating sample aspects of traffic flow between wireless nodes.
Figure 14:
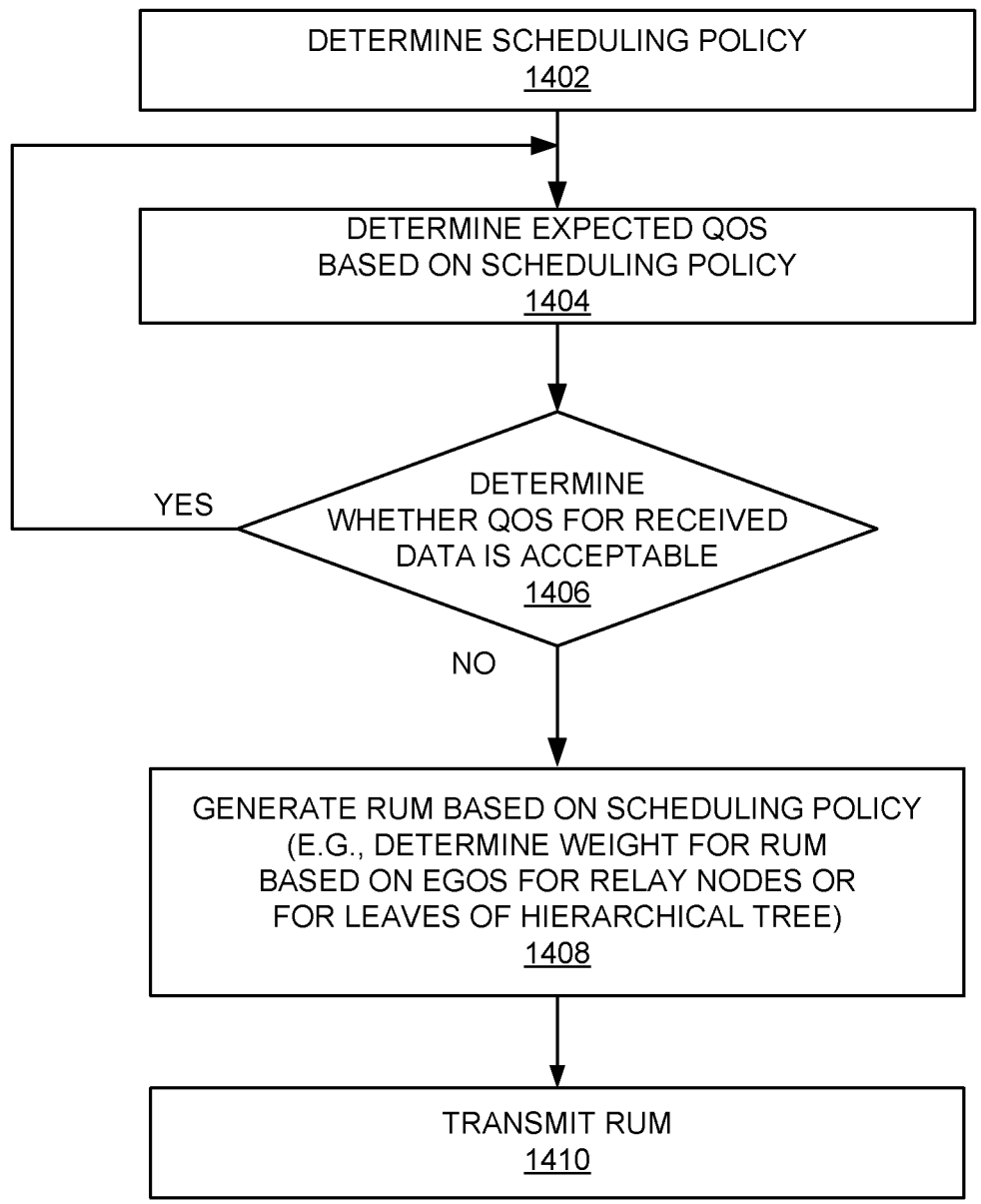
FIG. 14 is a flowchart of several sample aspects of operations that may be performed to facilitate traffic flow in a wireless communication system.
Figure 15:
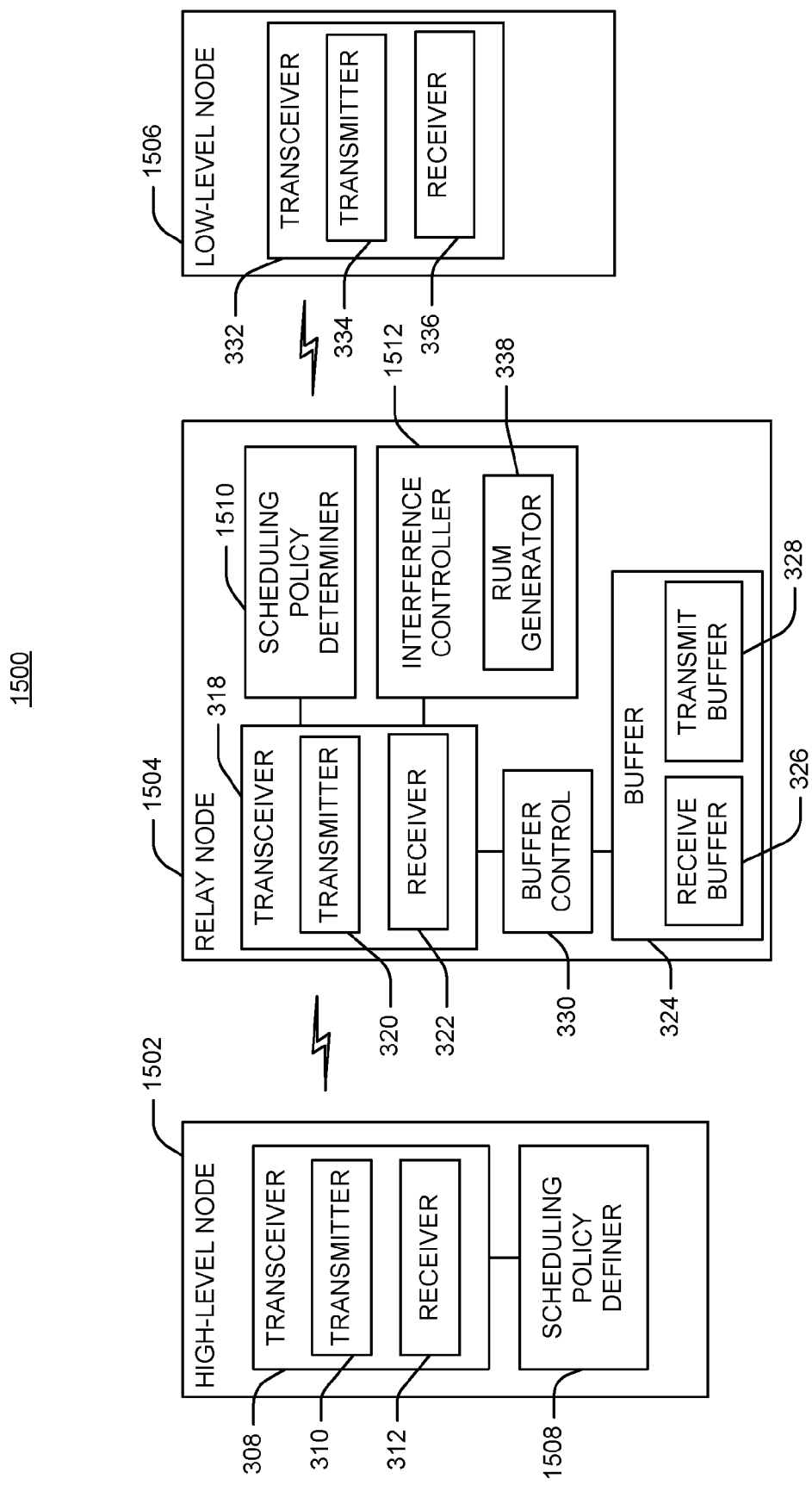
FIG. 15 is a simplified block diagram of several aspects of sample components of a wireless communication system.

Referring now to FIGS. 13-15, in some aspects a scheduling policy is used to define a quality of service indication (e.g., a weight) for an interference management message (e.g., a RUM) generated at a scheduling node. For example, RUM weight selection may take into account the type of the scheduler that is employed at a transmitting node. If the transmitting node used equal grade of service ("EGOS") across the leaves of a hierarchical tree, then the RUM weight may be set equal to the minimum throughput among the corresponding leaves of the tree. If the transmitting node uses EGOS across its immediate child nodes of the tree, then the RUM weight may be set equal to the total throughput of the node (e.g., the sum of the throughput of the corresponding leaves).

FIG. 13 illustrates an example of a multi-hop network 1300. Here, node A may be a wired access point, nodes B and C may be wireless access points (e.g., relay nodes), and nodes D, E, and F may be access terminals. For downlink traffic flow, data first passes through node A, then through either node B or node C, and may eventually end up at one or more of nodes D, E, and F. Thus node A is the root of this hierarchical tree, nodes B and C are intermediate nodes, and nodes D, E, and F are leaves of the tree.

In practice, node A may employ different scheduling policies in different situations. Depending on the selected scheduling policy, the intermediate nodes may use a different method of calculating the weight for any interference management messages they transmit.

For example, if node A employs EGOS across all leaves of the hierarchical tree, under a full-buffer traffic model, nodes D, E, and F will get equal quality of service (e.g., throughput). To do this, node A may provide to node B twice the throughput it provides to node C. In this case, node B may use as a RUM weight the minimum of the throughput for node D and the throughput for node E.

As another example, node A may employ EGOS across its immediate children. Under a full-buffer model, nodes B and C will get equal quality of service (e.g., throughput). In this case, node B may use as a RUM weight the sum of the throughputs of nodes D and E.

The above principles may be equally applicable to traffic flowing in the opposite direction. For example, reverse link traffic may flow from nodes D, E, and F, through nodes B and C, to node A. In the event EGOS is provided across nodes B and C, when node A sends a RUM, the RUM may be based on the throughput of node B or node C. In the event EGOS is provided across nodes D, E, and F, when node A sends a RUM, the RUM may be based on the combined throughput of nodes D, E, and F.

FIG. 14 illustrates several sample operations that may be performed in conjunction with determining whether to transmit an interference management message. For illustration purposes, these operations will be discussed in the context of a communication system 1500 shown in FIG. 15. Here, a relay node 1504 (e.g., device 304 of FIG. 3) may receive data from an upstream node 1502 (e.g., device 302) and transmit data to a downstream node 1506 (e.g., device 306). It should be appreciated, however, that the teaching herein may be applicable to other types of configurations (e.g., a single-hop configuration).

As represented by block 1402 of FIG. 14, a scheduling policy may be defined for traffic flow between nodes. To this end, the node 1502 (or some other node or component of a communication system) may comprise a scheduling policy definer 1508 that defines a scheduling policy based on a specified criterion. As an example, EGOS may be applied across all of the leaf nodes of a hierarchical tree in a case where a system provides voice traffic. In this case, an equal amount of traffic may be provided for each leaf node (e.g., access terminal) in each direction.

A node in the system that will send interference management messages may then obtain the defined scheduling policy for use in generating a quality of service indication (for convenience, the example of a RUM weight will be used hereafter). For example, the node 1504 may include a scheduling policy determiner 1510 that communicates via transceivers 308 and 318 with the scheduling policy definer 1508 to receive scheduling policy information.

As represented by block 1404, a node may then determine an expected level of quality of service (e.g., throughput) for its communication links or traffic flows. As mentioned above, the expected level of quality of service may be based on the scheduling policy. For example, in the case of EGOS across the intermediate nodes of FIG. 13, an expected throughput for node B may comprise the sum of the expected throughputs through nodes D and E. In the case of EGOS across the leaf nodes of FIG. 13, an expected throughput for node B may comprise the minimum expected throughput of either node D or node E. In some aspects this information may be defined by a node (e.g., an access point) that schedules the corresponding traffic flow. For example, the scheduling policy definer 1508 may define an expected throughput for a given flow and send this information to the scheduling policy determiner 1510. Alternatively, a given node (e.g., the scheduling policy determiner 1510) may define its own expected throughput (e.g., based on conditions seen at that node).

As represented by block 1406, an interference controller 1512 of the node 1504 may determine whether quality of service associated with received data is acceptable. In a similar manner as discussed above, this operation may involve comparing a quality of service metric associated with recently received data with a quality of service-related threshold (e.g., a RUM sending threshold that is based on the expected level of quality of service acquired at block 1404).

In the event the quality of service is unacceptable, the RUM generator 338 of the node 1504 may generate a RUM at block 1408. As mentioned above, the weight for the RUM may be based on the scheduling policy. For example, the weight of the RUM may be calculated based on a ratio of the expected quality of service (e.g., throughput) and the actual quality of service for a link or flow.

The actual quality of service may be determined in various ways depending on which node generates the RUM. When traffic is flowing from the node 1502 to node 1506, the node 1504 may readily determine the actual quality of service based on its traffic flow. When traffic is flowing from the node 1506 to node 1502, the node 1502 may be able to determine the actual quality of service for a given link of flow since all of the flows ultimately flow through the node 1502.

As represented by block 1410, the RUM generator 338 may then cooperate with the transmitter 320 to transmit the generated RUM in an attempt to reduce interference at the node 1504.

It should be appreciated that the teachings herein may be applicable to various types of networks. For example, in some aspects the teachings herein may be implemented in either a synchronous wireless network or an asynchronous wireless network.

In addition, in some aspects the teachings herein may be implemented in an ad hoc wireless network. In general, an ad hoc wireless network may enable wireless devices to communicate with one another without the use of a central coordinator such as an access point. Instead, functionality that may otherwise be provided by an access point (e.g., generating beacons and buffering traffic) may be implemented in and shared among all of the wireless terminals that form the ad hoc network. In a similar manner as mentioned above, one or more of the nodes of an ad hoc network may function as a relay node to extend the effective coverage area of the ad hoc network.

Figure 16:
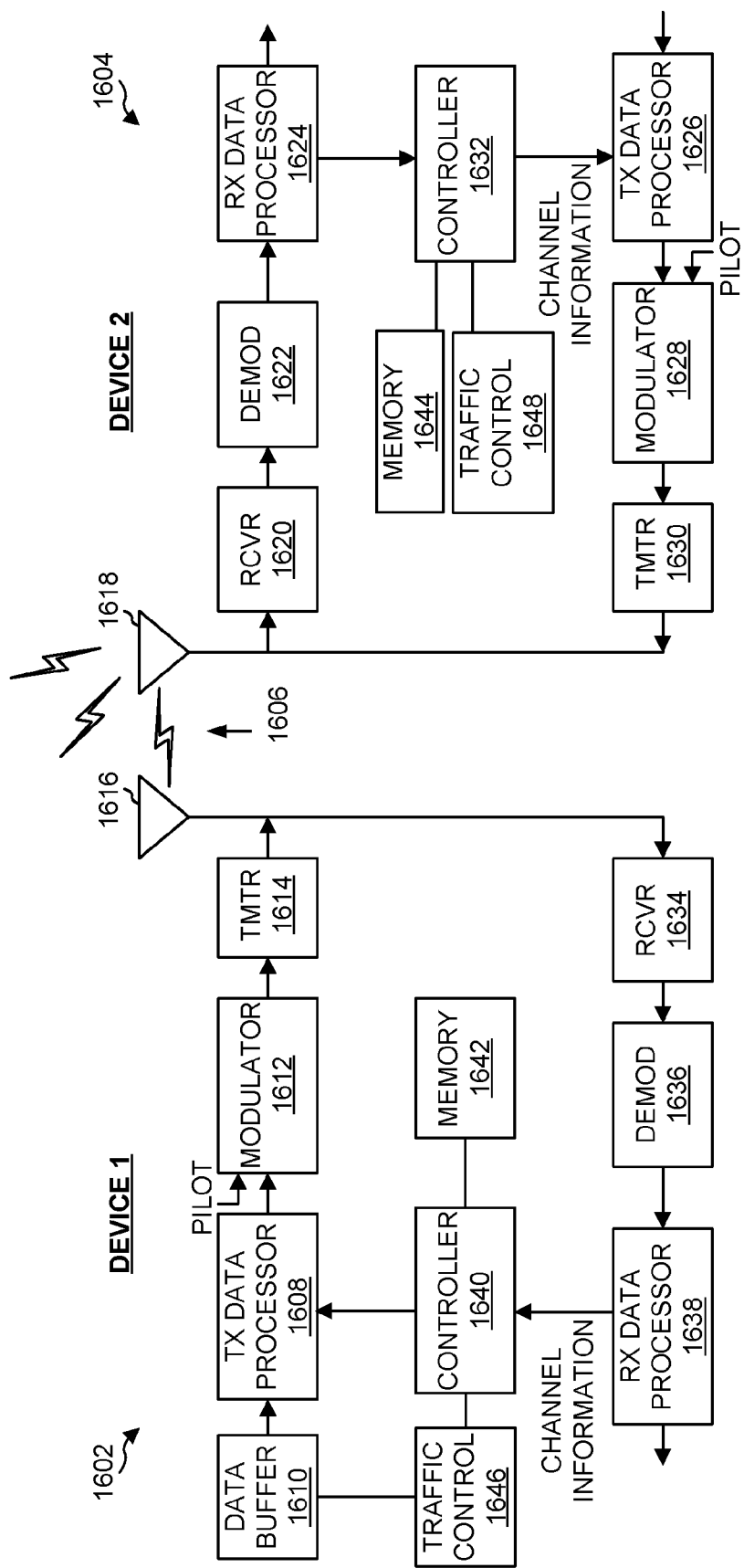
FIG. 16 is a simplified block diagram of several sample aspects of communication components.
Figure 17:
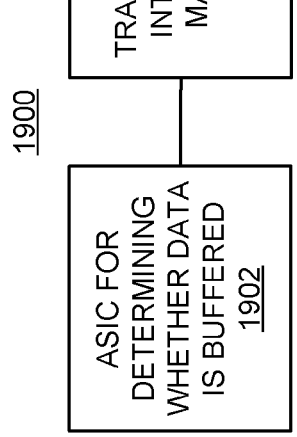
FIGS. 17-20 are simplified block diagrams of several sample aspects of apparatuses configured to facilitate wireless communication as taught herein.
Figure 18:
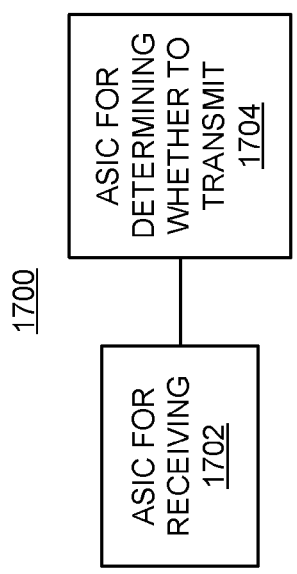
Figure 19:
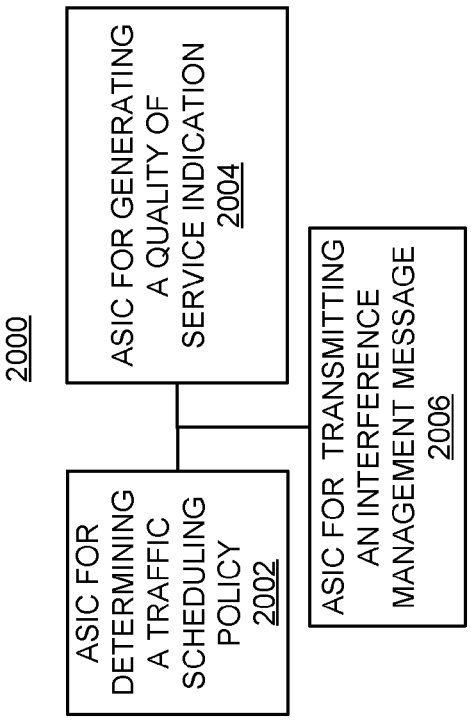
Figure 20:
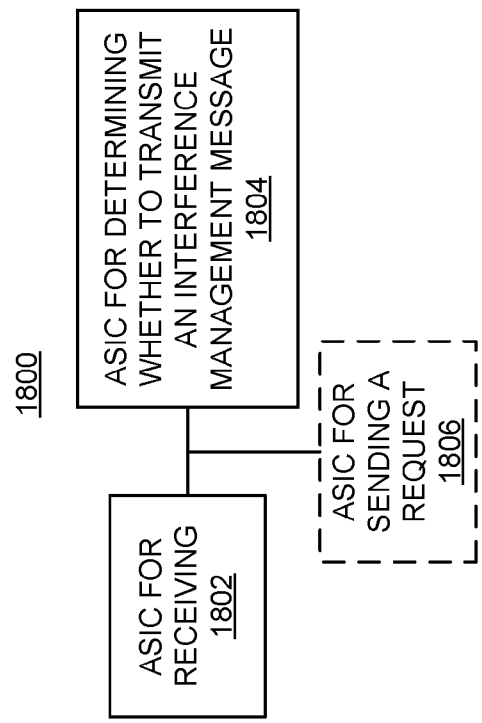

The teachings herein may be incorporated into a device employing various components for communicating with at least one other wireless device. FIG. 16 depicts several sample components that may be employed to facilitate communication between devices. Here, a first device 1602 (e.g., an access terminal) and a second device 1604 (e.g., an access point) are adapted to communicate via a wireless communication link 1606 over a suitable medium.

Initially, components involved in sending information from the device 1602 to the device 1604 (e.g., a reverse link) will be treated. A transmit ("TX") data processor 1608 receives traffic data (e.g., data packets) from a data buffer 1610 or some other suitable component. The transmit data processor 1608 processes (e.g., encodes, interleaves, and symbol maps) each data packet based on a selected coding and modulation scheme, and provides data symbols. In general, a data symbol is a modulation symbol for data, and a pilot symbol is a modulation symbol for a pilot (which is known a priori). A modulator 1612 receives the data symbols, pilot symbols, and possibly signaling for the reverse link, and performs modulation (e.g., OFDM or some other suitable modulation) and/or other processing as specified by the system, and provides a stream of output chips. A transmitter ("TMTR") 1614 processes (e.g., converts to analog, filters, amplifies, and frequency upconverts) the output chip stream and generates a modulated signal, which is then transmitted from an antenna 1616.

The modulated signals transmitted by the device 1602 (along with signals from other devices in communication with the device 1604) are received by an antenna 1618 of the device 1604. A receiver ("RCVR") 1620 processes (e.g., conditions and digitizes) the received signal from the antenna 1618 and provides received samples. A demodulator ("DEMOD") 1622 processes (e.g., demodulates and detects) the received samples and provides detected data symbols, which may be a noisy estimate of the data symbols transmitted to the device 1604 by the other device(s). A receive ("RX") data processor 1624 processes (e.g., symbol demaps, deinterleaves, and decodes) the detected data symbols and provides decoded data associated with each transmitting device (e.g., device 1602).

Components involved in sending information from the device 1604 to the device 1602 (e.g., a forward link) will be now be treated. At the device 1604, traffic data is processed by a transmit ("TX") data processor 1626 to generate data symbols. A modulator 1628 receives the data symbols, pilot symbols, and signaling for the forward link, performs modulation (e.g., OFDM or some other suitable modulation) and/or other pertinent processing, and provides an output chip stream, which is further conditioned by a transmitter ("TMTR") 1630 and transmitted from the antenna 1618. In some implementations signaling for the forward link may include power control commands and other information (e.g., relating to a communication channel) generated by a controller 1632 for all devices (e.g. terminals) transmitting on the reverse link to the device 1604.

At the device 1602, the modulated signal transmitted by the device 1604 is received by the antenna 1616, conditioned and digitized by a receiver ("RCVR") 1634, and processed by a demodulator ("DEMOD") 1636 to obtain detected data symbols. A receive ("RX") data processor 1638 processes the detected data symbols and provides decoded data for the device 1602 and the forward link signaling. A controller 1640 receives power control commands and other information to control data transmission and to control transmit power on the reverse link to the device 1604.

The controllers 1640 and 1632 direct various operations of the device 1602 and the device 1604, respectively. For example, a controller may determine an appropriate filter, reporting information about the filter, and decode information using a filter. Data memories 1642 and 1644 may store program codes and data used by the controllers 1640 and 1632, respectively.

FIG. 16 also illustrates that the communication components may include one or more components that perform traffic management-related operations as taught herein. For example, a traffic control component 1646 may cooperate with the controller 1640 and/or other components of the device 1602 to send and receive signals to another device (e.g., device 1604) as taught herein. Similarly, a traffic control component 1648 may cooperate with the controller 1632 and/or other components of the device 1604 to send and receive signals to another device (e.g., device 1602).

The teachings herein may be incorporated into (e.g., implemented within or performed by) a variety of apparatuses (e.g., devices). For example, each node may be configured, or referred to in the art, as an access point ("AP"), NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology. Certain nodes also may be referred to as access terminals. An access terminal also may be known as a subscriber station, a subscriber unit, a mobile station, a remote station, a remote terminal, a user terminal, a user agent, a user device, or user equipment. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless medium.

As mentioned above, in some aspects a wireless node may comprise an access device (e.g., a cellular or Wi-Fi access point) for a communication system. Such an access device may provide, for example, connectivity for or to a network (e.g., a wide area network such as the Internet or a cellular network) via a wired or wireless communication link. Accordingly, the access device may enable another device (e.g., a Wi-Fi station) to access the network or some other functionality.

A wireless node may thus include various components that perform functions based on data transmitted by or received at the wireless node. For example, an access point and an access terminal may include an antenna for transmitting and receiving signals (e.g., messages conveying information such as control and/or data). An access point also may include a traffic manager configured to manage data traffic flows that its receiver receives from a plurality of wireless nodes or that its transmitter transmits to a plurality of wireless nodes. In addition, an access terminal may include a user interface configured to output an indication based on received data.

A wireless device may communicate via one or more wireless communication links that are based on or otherwise support any suitable wireless communication technology. For example, in some aspects a wireless device may associate with a network. In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., transmitters 310, 320, and 334 and receivers 312, 322, and 336) that may include various components (e.g., signal generators and signal processors) that facilitate communication over a wireless medium.

The components described herein may be implemented in a variety of ways. Referring to FIGS. 17-20, each of the apparatuses 1700, 1800, 1900, and 2000 is represented as a series of interrelated functional blocks that may represent functions implemented by, for example, one or more integrated circuits (e.g., an ASIC) or may be implemented in some other manner as taught herein. As discussed herein, an integrated circuit may include a processor, software, other components, or some combination thereof.

The apparatuses 1700, 1800, 1900, and 2000 may include one or more modules that may perform one or more of the functions described above with regard to various figures. For example, an ASIC for receiving 1702 may correspond to, for example, a receiver as discussed herein. An ASIC for determining whether to transmit 1704 may correspond to, for example, a transmission controller as discussed herein. An ASIC for receiving 1802 may correspond to, for example, a receiver as discussed herein. An ASIC for determining whether to transmit an interference management message 1804 may correspond to, for example, an interference controller as discussed herein. An ASIC for sending a request 1806 may correspond to, for example, a traffic monitor as discussed herein. An ASIC for determining whether data is buffered 1902 may correspond to, for example, a traffic monitor as discussed herein. An ASIC for transmitting an interference management message 1904 may correspond to, for example, an interference controller as discussed herein. An ASIC for determining a traffic scheduling policy 2002 may correspond to, for example, a scheduling policy determiner as discussed herein. An ASIC for generating a quality of service indication 2004 may correspond to, for example, an interference controller as discussed herein. An ASIC for transmitting an interference management message 2006 may correspond to, for example, a transmitter as discussed herein.

As noted above, in some aspects these components may be implemented via appropriate processor components. These processor components may in some aspects be implemented, at least in part, using structure as taught herein. In some aspects a processor may be adapted to implement a portion or all of the functionality of one or more of these components. In some aspects one or more of the components represented by dashed boxes are optional.

As noted above, the apparatuses 1700, 1800, 1900, and 2000 may comprise one or more integrated circuits. For example, in some aspects a single integrated circuit may implement the functionality of one or more of the illustrated components, while in other aspects more than one integrated circuit may implement the functionality of one or more of the illustrated components.

In addition, the components and functions represented by FIGS. 17-20 as well as other components and functions described herein, may be implemented using any suitable means. Such means also may be implemented, at least in part, using corresponding structure as taught herein. For example, the components described above in conjunction with the "ASIC for" components of FIGS. 17-20 also may correspond to similarly designated "means for" functionality. Thus, in some aspects one or more of such means may be implemented using one or more of processor components, integrated circuits, or other suitable structure as taught herein.

Also, it should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., executable by at least one computer) relating to one or more of the aspects of the disclosure. In some aspects a computer program product may comprise packaging materials.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of multi-hop wireless communication, comprising:
   receiving, at a first wireless node, information relating to first data buffered at a second wireless node for transmission to a third wireless node;
   determining, at the first wireless node, that the first wireless node has second data that is to be forwarded by the second wireless node to the third wireless node;
   determining at the first wireless node, based on the information, whether there is a traffic bottleneck associated with data transmission from the second wireless node to the third wireless node; and
   determining at the first wireless node, based on the determination of whether there is a traffic bottleneck and based on whether transmission of the second data from the first wireless node will interfere with reception at a fourth wireless node, whether to transmit the second data from the first wireless node to the second wireless node or to instead transmit a message that informs the second wireless node to not expect a data transmission from the wireless node.

2. The method of claim 1, wherein the second wireless node comprises a wireless relay node.

3. The method of claim 1, wherein the information indicates a status of a transmit buffer of the second wireless node.

4. The method of claim 1, wherein the information indicates whether an amount of the first data in a transmit buffer of the second wireless node is less than, equal to, or greater than a threshold.

5. The method of claim 4, wherein the determination of whether to transmit the second data comprises determining not to transmit the second data when the amount of the first data in the transmit buffer is greater than or equal to the threshold.

6. The method of claim 1, wherein the information indicates a data flow rate from the second wireless node to the third wireless node.

7. The method of claim 1, wherein the determination of whether to transmit the second data comprises determining not to transmit the second data when the information indicates a reduction in data throughput over a data routing path from the second wireless node to the third wireless node.

8. The method of claim 1, wherein the determination of whether to transmit the second data comprises determining not to transmit the second data, the method further comprising transmitting, as a result of the determination not to transmit the second data, the message to the second wireless node to prevent the second wireless node from transmitting an interference management message concerning reception of data from the first wireless node.

9. The method of claim 8, wherein the interference management message comprises an indication of a degree to which data reception at the second wireless node is adversely affected by interfering transmissions from at least one other wireless node.

10. The method of claim 1, wherein the determination of whether to transmit the second data comprises determining not to transmit the second data when the information indicates that the second data will not be forwarded by the second wireless node in a desired manner.

11. The method of claim 10, wherein the desired manner relates to a desired throughput rate or a desired latency time.

12. The method of claim 1, wherein the determination of whether to transmit the second data comprises determining not to transmit the second data, the method further comprising, as a result of the determination not to transmit the second data, temporarily buffering the second data in a buffer of the first wireless node.

13. The method of claim 12, further comprising monitoring buffer status of the second wireless node to determine when to send the buffered second data to the second wireless node.

14. An apparatus for multi-hop wireless communication, comprising:
a receiver configured to receive information relating to first data buffered at a first wireless node for transmission to a second wireless node; and
a transmission controller configured to:
determine that the apparatus has second data that is to be forwarded by the first wireless node to the second wireless node,
determine, based on the information, whether there is a traffic bottleneck associated with data transmission from the first wireless node to the second wireless node, and
determine, based on the determination of whether there is a traffic bottleneck and based on whether transmission of the second data from the apparatus will interfere with reception at a third wireless node, whether to transmit the second data from the apparatus to the first wireless node or to instead transmit a message that informs the first wireless node to not expect a data transmission from the apparatus.

15. The apparatus of claim 14, wherein the first wireless node comprises a wireless relay node.

16. The apparatus of claim 14, wherein the information indicates a status of a transmit buffer of the first wireless node.

17. The apparatus of claim 14, wherein the information indicates whether an amount of the first data in a transmit buffer of the first wireless node is less than, equal to, or greater than a threshold.

18. The apparatus of claim 17, wherein the transmission controller is further configured to determine not to transmit the second data when the amount of the first data in the transmit buffer is greater than or equal to the threshold.

19. The apparatus of claim 14, wherein the information indicates a data flow rate from the first wireless node to the second wireless node.

20. The apparatus of claim 14, wherein the determination of whether to transmit the second data comprises determining not to transmit the second data when the information indicates a reduction in data throughput over a data routing path from the first wireless node to the second wireless node.

21. The apparatus of claim 14, wherein:
the determination of whether to transmit the second data comprises determining not to transmit the second data; and
the transmission controller is further configured to transmit, as a result of the determination not to transmit the second data, the message to the first wireless node to prevent the first wireless node from transmitting an interference management message concerning reception of data from the apparatus.

22. The apparatus of claim 21, wherein the interference management message comprises an indication of a degree to which data reception at the first wireless node is adversely affected by interfering transmissions from at least one other wireless node.

23. The apparatus of claim 14, wherein the determination of whether to transmit the second data comprises determining not to transmit the second data when the information indicates that the second data will not be forwarded by the first wireless node in a desired manner.

24. The apparatus of claim 23, wherein the desired manner relates to a desired throughput rate or a desired latency time.

25. The apparatus of claim 14, wherein:
the determination of whether to transmit the second data comprises determining not to transmit the second data; and
the transmission controller is further configured to temporarily buffer the second data in a buffer of the apparatus as a result of the determination not to transmit the second data.

26. The apparatus of claim 25, wherein the transmission controller is further configured to monitor buffer status of the first wireless node to determine when to send the buffered second data to the first wireless node.

27. An apparatus for multi-hop wireless communication, comprising:
means for receiving information relating to first data buffered at a first wireless node for transmission to a second wireless node;
means for determining that the apparatus has second data that is to be forwarded by the first wireless node to the second wireless node;
means for determining, based on the information, whether there is a traffic bottleneck associated with data transmission from the first wireless node to the second wireless node; and
means for determining, based on the determination of whether there is a traffic bottleneck and based on whether transmission of the second data from the apparatus will interfere with reception at a third wireless node, whether to transmit the second data from the apparatus to the first wireless node or to instead transmit a message that informs the first wireless node to not expect a data transmission from the apparatus.

28. The apparatus of claim 27, wherein the first wireless node comprises a wireless relay node.

29. The apparatus of claim 27, wherein the information indicates a status of a transmit buffer of the first wireless node.

30. The apparatus of claim 27, wherein the information indicates whether an amount of the first data in a transmit buffer of the first wireless node is less than, equal to, or greater than a threshold.

31. The apparatus of claim 30, wherein the means for determining determines not to transmit the second data when the amount of the first data in the transmit buffer is greater than or equal to the threshold.

32. The apparatus of claim 27, wherein the information indicates a data flow rate from the first wireless node to the second wireless node.

33. The apparatus of claim 27, wherein the determination of whether to transmit the second data comprises determining not to transmit the second data when the information indicates a reduction in data throughput over a data routing path from the first wireless node to the second wireless node.

34. The apparatus of claim 27, wherein:
 the determination of whether to transmit the second data comprises determining not to transmit the second data; and
 the apparatus further comprises means for transmitting, as a result of the determination not to transmit the second data, the message to the first wireless node to prevent the first wireless node from transmitting an interference management message concerning reception of the data from the apparatus.

35. The apparatus of claim 34, wherein the interference management message comprises an indication of a degree to which data reception at the first wireless node is adversely affected by interfering transmissions from at least one other wireless node.

36. A computer-program product for multi-hop wireless communication, comprising:
 non-transitory computer-readable storage medium comprising codes executable to:
  receive, at a first wireless node, information relating to first data buffered at a second wireless node for transmission to a third wireless node;
  determine, at the first wireless node, that the first wireless node has second data that is to be forwarded by the second wireless node to the third wireless node;
  determine at the first wireless node, based on the information, whether there is a traffic bottleneck associated with data transmission from the first wireless node to the second wireless node; and
  determine at the first wireless node, based on the determination of whether there is a traffic bottleneck and based on whether transmission of the second data from the first wireless node will interfere with reception at a fourth wireless node, whether to transmit the second data from the first wireless node to the second wireless node or to instead transmit a message that informs the second wireless node to not expect a data transmission from the first wireless node.

37. An access point, comprising:
an antenna;
a receiver configured to receive, via the antenna, information relating to first data buffered at a first wireless node for transmission to a second wireless node; and
a transmission controller configured to:
 determine that the access point has second data that is to be forwarded by the first wireless node to the second wireless node,
 determine, based on the information, whether there is a traffic bottleneck associated with data transmission from the first wireless node to the second wireless node, and
 determine, based on the determination of whether there is a traffic bottleneck and based on whether transmission of the second data from the access point will interfere with reception at a third wireless node, whether to transmit the second data from the access point to the first wireless node or to instead transmit a message that informs the first wireless node to not expect a data transmission from the access point.

38. An access terminal, comprising:
a receiver configured to receive information relating to first data buffered at a first wireless node for transmission to a second wireless node;
a transmission controller configured to:
 determine that the access terminal has second data that is to be forwarded by the first wireless node to the second wireless node,
 determine, based on the information, whether there is a traffic bottleneck associated with data transmission from the first wireless node to the second wireless node, and
 determine, based on the determination of whether there is a traffic bottleneck and based on whether transmission of the second data from the access terminal will interfere with reception at a third wireless node, whether to transmit the second data from the access terminal to the first wireless node or to instead transmit a message that informs the first wireless node to not expect a data transmission from the access terminal; and
a user interface configured to output an indication based on data received via the receiver.

* * * * *